United States Patent
Tanaka et al.

(10) Patent No.: US 9,871,265 B2
(45) Date of Patent: Jan. 16, 2018

(54) METHOD FOR MANUFACTURING A SOLID OXIDE FUEL CELL DEVICE

(71) Applicant: TOTO LTD., Kitakyushu-shi, Fukuoka (JP)

(72) Inventors: Shuhei Tanaka, Chigasaki (JP); Naoki Watanabe, Chigasaki (JP); Nobuo Isaka, Chigasaki (JP); Masaki Sato, Fujisawa (JP); Takuya Hoshiko, Kanagawa (JP); Yutaka Momiyama, Yokohama (JP); Shigeru Ando, Odawara (JP); Osamu Okamoto, Chigasaki (JP); Kiyoshi Hayama, Fujisawa (JP); Seiki Furuya, Fujisawa (JP); Yasuo Kakinuma, Ayase (JP)

(73) Assignee: TOTO LTD., Fukuoka (JP)

( * ) Notice: Subject to any disclaimer, the term of this patent is extended or adjusted under 35 U.S.C. 154(b) by 40 days.

(21) Appl. No.: 14/640,990

(22) Filed: Mar. 6, 2015

(65) Prior Publication Data
US 2015/0255825 A1  Sep. 10, 2015

(30) Foreign Application Priority Data
Mar. 7, 2014  (JP) .................. 2014-044877

(51) Int. Cl.
*H01M 8/24* (2016.01)
*H01M 8/12* (2016.01)
(Continued)

(52) U.S. Cl.
CPC ........... *H01M 8/24* (2013.01); *H01M 8/0297* (2013.01); *H01M 8/12* (2013.01); *H01M 8/243* (2013.01);
(Continued)

(58) Field of Classification Search
None
See application file for complete search history.

(56) References Cited

U.S. PATENT DOCUMENTS

2007/0111069 A1  5/2007  Rehg et al.
2009/0087714 A1  4/2009  Hama et al.

FOREIGN PATENT DOCUMENTS

EP  1 786 056 A1  5/2007
EP  1786056 A1 *  5/2007
(Continued)

OTHER PUBLICATIONS

Extended European Search Report in corresponding European Application No. 15157774.9, dated Jul. 31, 2015, 6 pages.
(Continued)

*Primary Examiner* — Daniel Gatewood
(74) *Attorney, Agent, or Firm* — Brinks Gilson & Lione

(57) ABSTRACT

To provide a method for manufacturing SOFC, capable of preventing breakage of fuel cell electrodes, and of securing an electrical connection between fuel cells and a current collector. Step for forming electrode protective layers 152 on electrodes formed on fuel cells 16, modularization step for forming a cell array, and attaching step for attaching a current collector 82 to the cell array, wherein current collector 82 is a metal plate on which attaching holes 84 are formed for the insertion of fuel cells 16, elastic pieces 84*a* are formed at each attaching hole 84, fuel cells 16 are inserted into attaching holes 84, and current collector 82 is attached to the cell array by the elastic force; and protective layer 152 is constituted to prevent damage to electrodes caused by contact with elastic pieces.

6 Claims, 15 Drawing Sheets

(51) Int. Cl.
*H01M 8/243* (2016.01)
*H01M 8/0297* (2016.01)
*H01M 8/124* (2016.01)

(52) U.S. Cl.
CPC ............ *H01M 2008/1293* (2013.01); *H01M 2300/0071* (2013.01); *Y02P 70/56* (2015.11)

(56) References Cited

FOREIGN PATENT DOCUMENTS

| JP | 2000-182642 A | 6/2000 |
|----|---------------|--------|
| WO | WO 2007/037351 A1 | 4/2007 |
| WO | WO2007037351 A1 * | 4/2007 |

OTHER PUBLICATIONS

Office Action, and English language translation thereof, in corresponding Japanese Application No. 2014-044877, dated Nov. 22, 2017, pages.

* cited by examiner

FIG.7
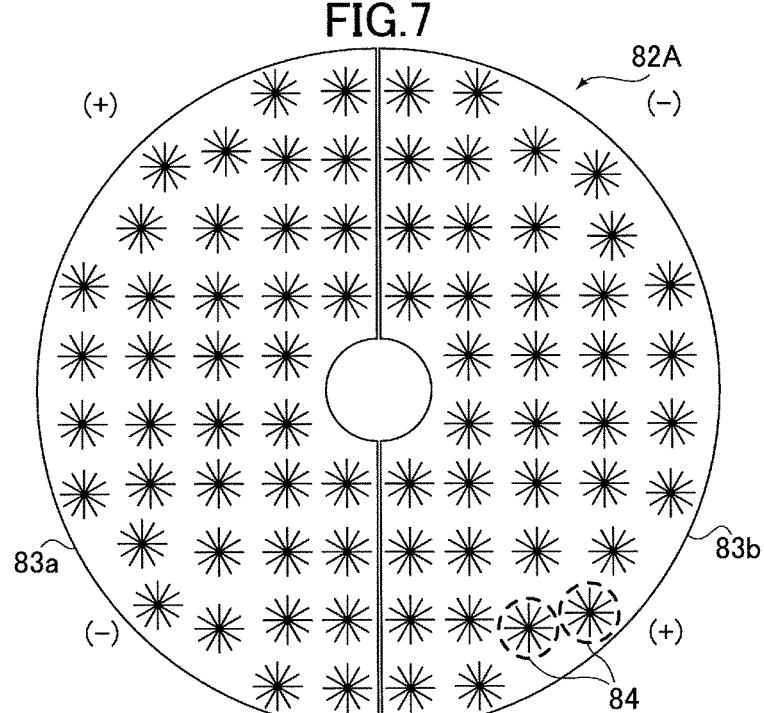
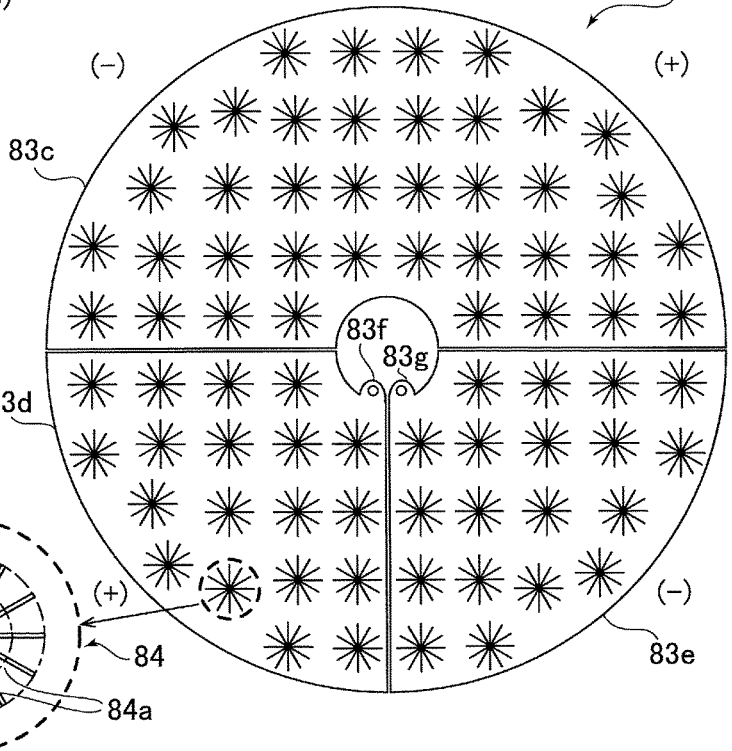

METHOD FOR MANUFACTURING A SOLID OXIDE FUEL CELL DEVICE

RELATED APPLICATIONS

This application claims priority under 35 U.S.C. §119 to Japanese Patent Application No. 2014-044877 filed on Mar. 7, 2014, the entire contents of which is hereby incorporated by reference.

BACKGROUND OF THE INVENTION

1. Field of the Invention

The present invention pertains to a method for manufacturing a solid oxide fuel cell device, and in particular to a method for manufacturing a solid oxide fuel cell device comprising a current collector electrically connecting a plurality of individual fuel cells housed in a fuel cell module.

2. Description of the Related Art

A solid oxide fuel cell ("SOFC" below) device is a fuel cell device which operates at a relatively high temperature in which, using an oxide ion conducting solid electrolyte as an electrolyte, with electrodes attached to both sides thereof, fuel gas is supplied to one side and oxidizer gas (air, oxygen, or the like) is supplied to the other side.

The solid oxide fuel cell device houses, within a fuel cell module, a cell array formed of a plurality of individual fuel cells (cell tubes). In this cell array, the plurality of individual fuel cells are electrically interconnected by a current collector. For example, in the fuel cell device set forth in Japanese Published Unexamined Patent Application 2008-71711 (Patent Document 1), the top ends and bottom ends of the plurality of individual fuel cells are respectively inserted into holes in electrically insulating support plates and affixed to the support plates using an electrically conductive seal material. Furthermore, connections are made using a connecting member between top end portions and between bottom end portions of adjacent individual fuel cells, mediated by an electrically conductive seal material.

In the fuel cell device set forth in Japanese Published Unexamined Patent Application 2008-218005 (Patent Document 2), the top end portions and bottom end portions of a large number of individual fuel cells are electrically interconnected using 3 current collectors.

3. Prior Art References—Patent Citations

Patent Document 1: Japanese Published Unexamined Patent Application 2008-71711

Patent Document 2: Japanese Published Unexamined Patent Application 2008-218005

SUMMARY OF THE INVENTION

Problems to be Solved by the Invention

For a fuel cell device such as that in Patent Document 1, however, the work of electrically interconnecting individual fuel cells becomes extremely cumbersome when connecting between adjacent individual fuel cell end portions at the two end portions of the individual fuel cells using connecting members and seal material if there is a large number of individual fuel cells.

On the other hand, in the fuel cell device of Patent Document 2, a large number of individual fuel cell end portions are electrically connected using only 3 current collectors, facilitating the work of electrically connecting the individual fuel cells. Specifically, attaching holes for attaching a plurality of corresponding individual fuel cells are formed on each current collector, and at each attaching hole, a plurality of elastic pieces extend in a radial direction from the edge portion of the hole toward its center. For this reason, the end portions of corresponding individual fuel cells can be pushed into the plurality of attaching holes at each current collector by pressing each current collector relative to a cell array comprising a plurality of individual fuel cells. The plurality of elastic pieces at each attaching hole can then be elastically brought into contact with the outer periphery surface of the corresponding individual fuel cell. Ease of work is thus greatly improved for the work of attaching current collectors to the large number of individual fuel cells, and the work of electrically interconnecting individual fuel cells is simplified.

However, the present inventors discovered the following problems with current collectors such as those set forth in Patent Document 2. Namely, because individual fuel cells are formed of ceramic material, there is variability in the shapes (diameter, length, bend, etc.) of each of the individual fuel cells. Therefore in a cell array formed of a plurality of individual fuel cells, the end portion of each fuel cell is offset from the ideal position.

Hence even if current collectors are positioned relative to a cell array, the axial centers of some of the individual cells are offset relative to corresponding attaching holes of the current collectors, so that in the operation of attaching a current collector to a cell array, the pressing force required to press a current collector onto a cell array is increased. There is also a risk that excessively pushing a current collector onto a cell array may cause an electrode disposed on the outside surface of an individual fuel cell to be peeled off by the elastic piece. Such damage to an electrode adversely affects cell performance and device lifespan.

To facilitate insertion of current collectors into a plurality of individual fuel cells and also prevent peeling of electrodes at the time of insertion, the current collector should be thin to decrease the elasticity of the elastic pieces. However, in the fuel cell device of Citation 2, the current collector and individual fuel cell are brought into contact using the elasticity of the elastic pieces, therefore the electrical connection between the current collector and the individual fuel cell is lost when the elasticity of the elastic pieces declines. In other words, if the current collector thickness is reduced and the elasticity of the elastic piece is decreased, there is a risk that uneven contact by elastic pieces (i.e., failure to appropriately contact the individual fuel cell by a portion of the plurality of elastic pieces of the attaching hole) will occur when attaching the current collector to a cell array, or during operation of the fuel cell device. In particular, if an elastic piece is exposed to a high temperature (e.g., 600° C. or above) during operation, there is a risk that the coefficient of elasticity of the elastic piece will decrease, and the elastic force of the elastic piece will be lost due to recrystallization or the like, thereby causing uneven contact of the elastic piece. When a conductivity failure occurs in some of the elastic pieces, current concentrates in the contacting elastic pieces, thereby concentrating current in certain individual fuel cells or a portion thereof, degrading the specified cell functionality and shortening product lifespan.

Thus in the current collector structure of the fuel cell device of Patent Document 2, the work of attaching the current collector to the cell array was eased, but there was risk of damage to electrodes of individual fuel cells when attaching the current collector, and of poor conductivity occurring between the current collector and individual fuel cells, at least during operation of the fuel cell device.

Therefore in a method for manufacturing a solid oxide fuel cell device having a structure electrically connecting a plurality of individual fuel cells using a current collector, the present invention has the object of providing a method for manufacturing a solid oxide fuel cell device capable of preventing breakage of electrodes of the individual fuel cells, and of securing an electrical connection between individual fuel cells and the current collector.

Means for Solving Problems

To resolve the above-described problem, the present invention is: a method for manufacturing a solid oxide fuel cell device comprising a cell array including a plurality of individual fuel cells housed in a fuel cell module, and a current collector electrically connected to electrodes formed on the end portions of the plurality of individual fuel cells constituting the cell array, comprising: a step for respectively forming electrically conductive electrode protective layers on electrodes formed on the end portions of the plurality of individual fuel cells; a modularization step for forming a cell array from the plurality of individual fuel cells; and an attaching step for attaching a current collector to the cell array, wherein the current collector is a metal plate in which a plurality of attaching holes are formed for respectively inserting the end portions of the plurality of individual fuel cells, a plurality of elastic pieces are provided at each attaching hole, and by pressing the current collector into the cell array, the end portions of the individual fuel cells are inserted into the corresponding attaching holes of the current collector, and the current collector is attached to the cell array by the elastic force of the elastic pieces; wherein the electrode protective layer is constituted to prevent damage to the electrode caused by contact of the elastic pieces in the attaching step.

When elastically attaching a current collector to a cell array by pushing the current collector onto the cell array and causing individual fuel cells to be inserted into a plurality of attaching holes of the current collector, the current collector must be inserted with a large pushing force onto the cell array when elastically attaching the current collector to the cell array, due to the fact that the manufactured dimensional accuracy of individual fuel cells is not high. However, there is a risk that pressing on a current collector with excessive force may damage individual fuel cells (especially the electrode layer). In particular, if the elastic force of an elastic piece formed at the attaching hole of the current collector is large, the electrode layer of individual fuel cells is scratched due to scraping of the outer periphery surface of the individual fuel cells by elastic pieces during insertion.

To avoid such damage to individual fuel cells, the elastic force of the elastic piece must be set low by forming the elastic piece of a thin sheet material. However, if the elastic force of the elastic piece is low, the elastic piece may make uneven contact at time of attachment due to manufacturing dimensional error in individual fuel cells, posing the risk of poor conductivity between elastic pieces and electrodes, starting in manufacturing. Also, if the elastic force of the elastic piece is low, when the current collector is exposed to high temperature during operation of the fuel cell device, the risk will occur such that elastic pieces make uneven contact due to a drop in the elastic force of the elastic pieces and then partial poor conductivity occurs between elastic pieces and electrodes of individual fuel cells.

Therefore the present invention is constituted so that a current collector having elastic pieces with a large elastic force can be used so that the elastic pieces have sufficient elastic force when attaching, and during high temperature operation. Hence in the present invention, an electrode protective layer is formed on electrodes of individual fuel cells to prevent damage to the electrodes by elastic pieces when attaching a current collector to a cell array. This electrode protective layer is an electrically conductive layer which is harder than the electrode. This electrode protective layer enables individual fuel cells to be protected from peeling of electrodes due to scraping thereof by elastic pieces at the time of attachment. Also, because elastic pieces with a high elastic force elastically engage the electrode protective layer, conduction can be assured between the current collector and the electrodes of individual fuel cells through the electrode protective layer.

Thus in the present invention, by adoption of an electrode protective layer, electrodes of individual fuel cells can be protected when attaching a current collector, even if the current collector used has elastic pieces with a large elastic force. As a result, in the present invention damage to electrodes can be prevented while good workability is preserved for attaching the current collector to a cell array. Also, in the present invention elastic pieces can have a large elastic force, therefore when attaching a current collector, and during operation, the state of contact between elastic pieces and electrode protective layers can be held by the elastic force of the elastic pieces, thereby preventing uneven contact.

Also, because a plurality of individual fuel cells are densely concentrated in a cell array, the spacing between individual fuel cells is narrow. Therefore after forming a cell array, attempting to form an electrode protective layer on the side surface of each fuel cell results in poor ease of work, making it difficult to reliably form an electrode protective layer on electrode surfaces. Therefore the present invention is constituted so that prior to a modularization step in which a cell array is formed, an electrode protective layer forming step is executed to form an electrode protective layer on each fuel cell electrode. This permits the forming of an electrode protective layer on each fuel cell electrode with good workability.

The present invention preferably further comprises, after the attaching step, an adhesion step for adhering the elastic pieces and the electrode protective layer.

The present invention thus constituted comprises, after the step for attaching the current collector to the cell array, the adhesion step for adhering the elastic pieces and the electrode protective layer, therefore a contacting state between the elastic pieces and the electrode protective layer can be secured. As a result, the adhesive force of the adhesive compensates for the amount of reduction in the elastic force of elastic pieces during operation, so conductivity is secured between elastic pieces and the electrode protective layer even if elastic pieces lose their elastic force. Hence it is unnecessary to consider drops in elastic force during operation, so the current collector comprising elastic pieces with an extremely large elastic force is not necessarily required. Therefore in the attaching step, the work of attaching the current collector is eased, and workability is improved.

In the present invention the electrode protective layer preferably has the function of adhering the elastic pieces and the electrode. In the invention thus constituted, the electrode protective layer has an adhering function, therefore a step of applying adhesive is not required after the attaching step, and the manufacturing process can be simplified.

In the present invention the adhering function is activated by heating the electrode protective layers; the method for manufacturing the solid oxide fuel cell device includes a heating step for heating the cell array to perform a certain process; the heating step doubles as a step for heating the electrode protective layer in the adhesion step.

In the invention thus constituted, the electrode protective layer is constituted so that the adhering function is activated by heating. Therefore while a step for heating the electrode protective layer is necessary, when the heating step is executed on a fuel cell device assembly during manufacturing, the ability to execute other steps on the assembly during the heating step is lost. Specifically, in the heating step, after heating the assembly to a predetermined temperature, cooling to room temperature is again required, and if rapid cooling is used, electric generation elements of the individual fuel cells are subjected to stress and damaged due to sudden thermal shrinkage. To prevent this type of damage, cooling requires a long duration. Hence the addition of a heating step for an electrode protective layer during manufacturing results in a major lengthening of the manufacturing process.

The present invention is therefore constituted so that the heating step included in the original manufacturing process (e.g., a reduction step for fuel cells implemented at a final stage) also serves as a heating step for an electrode protective layer. This eliminates the need to add a heating step solely for the electrode protective layer, so that lengthening of the manufacturing process can be prevented and elastic pieces can be adhered to the electrode protective layer.

In the present invention the adhering function is preferably activated by heating the electrode protective layer to fluidity and then solidifying at least a portion of the electrode protective layer.

In the present invention the adhering function is activated by solidification of at least a portion of the electrode protective layer after it has attained fluidity through heating. Therefore, due to the fluidization of the electrode protective layer, an elastic piece which had been elastically contacting the electrode protective layer now eats into the electrode protective layer so as to sink into that electrode protective layer, and the electrode protective layer solidifies in this state. Since this leads to increased contact surface area between the elastic piece and the electrode protective layer, electrical conductivity between the current collector and the electrode protective layer increases, as does the physical adhesion force between the two. Hence resistance to the stresses applied to the adhering portion between the elastic pieces and the electrode protective layer can be increased when individual fuel cells with manufacturing variability respectively thermally expand during operation. In this manner, the present invention enables the strengthening of the electrical connection between the current collector and the electrode protective layer.

In the present invention the electrode protective layer preferably includes granular electrically conductive material, and the adhesion step is a step for sintering the granular electrically conductive material.

In the invention thus constituted, the electrode protective layer contains granular conductive material (e.g., nickel powder). Thus by adjusting the grain size of the conductive material, the conductive material can be sintered and adhered to the elastic piece in the heating step before the elastic piece loses elastic force. Also, because the conductive material is elastically pressed by elastic pieces, density is increased by sintering in the portion of the conductive material pressed by the elastic pieces. Thus electrical conductivity between elastic pieces and electrodes via an electrode protective layer can be improved.

Effect of the Invention

Using the method for manufacturing for a solid oxide fuel cell device of the present invention, failure of electrodes of individual fuel cells can be prevented and electrical conductivity between individual fuel cells and the current collector can be secured.

BRIEF DESCRIPTION OF THE DRAWINGS

FIG. 7: An explanatory figure of a current collector used in the solid oxide fuel cell device according to an embodiment of the present invention.

DETAILED DESCRIPTION OF THE PREFERRED EMBODIMENTS

Next, referring to the attached drawings, we discuss a solid oxide fuel cell (SOFC) device according to an embodiment of the present invention.

Figure 1:
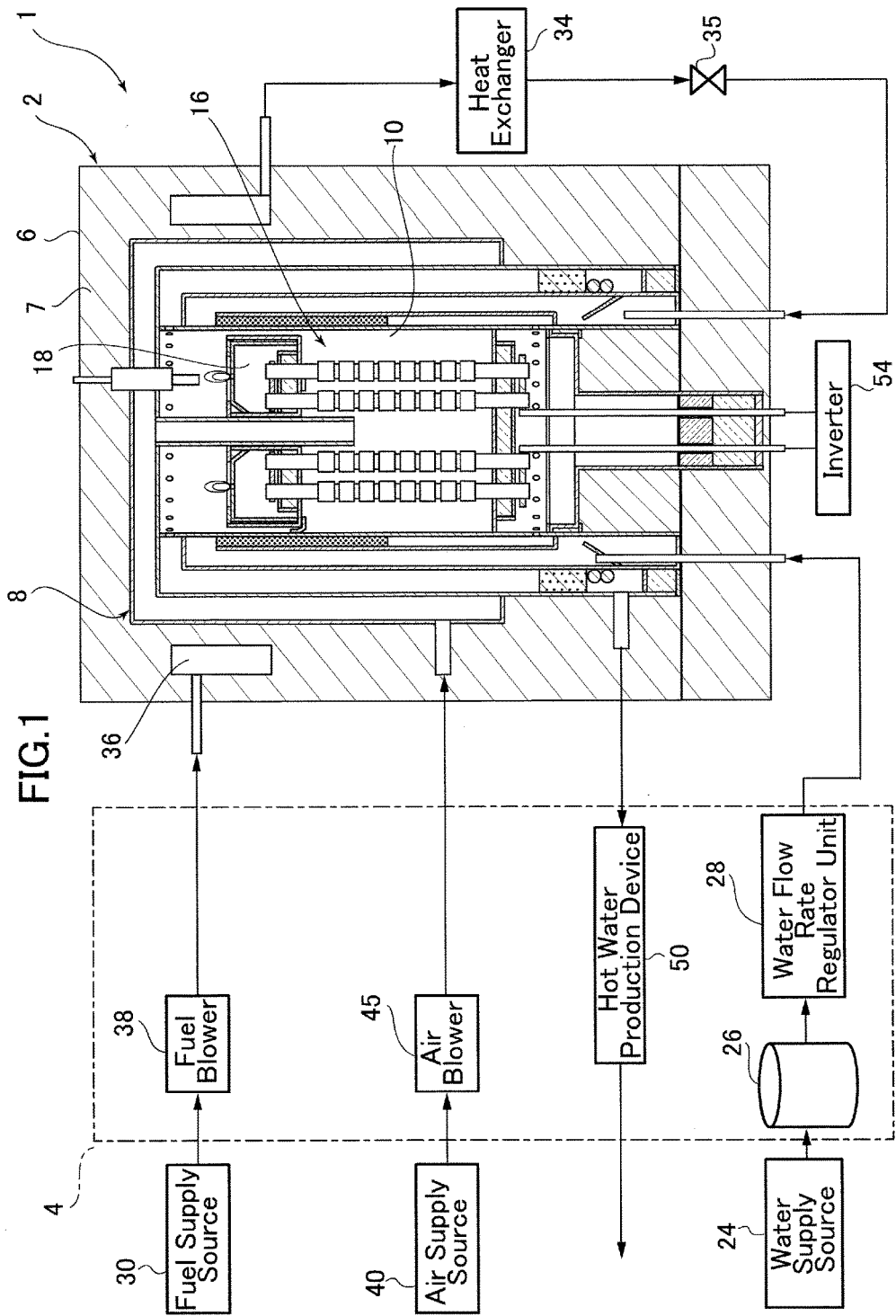
FIG. 1: An overview diagram showing a solid oxide fuel cell (SOFC) device according to an embodiment of the present invention.

FIG. 1 is an overview diagram showing a solid oxide fuel cell (SOFC) device according to an embodiment of the present invention. As shown in FIG. 1, the solid oxide fuel cell (SOFC) device of this embodiment of the present invention is furnished with a fuel cell module 2 and an auxiliary unit 4.

Fuel cell module 2 is furnished with a housing 6, and a fuel cell housing container 8 is formed within this housing 6, mediated by heat storage material 7. A generating chamber 10 is formed on the interior of this fuel cell housing container 8; a plurality of individual fuel cells 16 are concentrically disposed within this generating chamber 10, and the generating reaction between fuel gas and air, which is the oxidizing gas, is carried out by these individual fuel cells 16.

Exhaust collection chamber 18 is attached to the top end portion of each fuel cell 16. Residual fuel (off-gas), unused for the generating reaction and remaining in each fuel cell 16 is collected in the exhaust collection chamber 18 attached to the top end portion and flows out of the plurality of jet openings placed in the ceiling surface of exhaust collection chamber 18. Outflowing fuel is combusted in the generating chamber 10 using remaining air not used for generation, thereby producing exhaust gas.

Next, auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from this pure tank. Also, auxiliary unit 4 comprises a fuel blower 38 (a motor-driven "fuel pump" or the like), being a fuel supply device, for regulating the flow rate of hydrocarbon raw fuel gas supplied from fuel supply source 30, such as municipal gas.

Note that raw fuel gas which has passed through fuel blower 38 is directed into fuel cell holding container 8 through a desulfurizer 36 disposed inside fuel cell module 2, a heat exchanger 34, and an electromagnetic valve 35. The desulfurizer 36 is disposed in a ring shape around fuel cell housing container 8, and operates to remove sulfur from raw fuel gas. Heat exchanger 34 is provided to prevent the inflow of high temperature raw fuel gas, the temperature of which has risen in the desulfurizer 36, from flowing directly into electromagnetic valve 35 and degrading electromagnetic valve 35. Electromagnetic valve 35 is provided to stop the supply of raw fuel gas into the fuel cell housing container 8.

Auxiliary unit 4 is furnished with an air flow regulator unit 45 (a motor-driven "air blower" or the like), which is an oxidant gas supply device for regulating the flow rate of air supplied from air supply source 40.

Furthermore, auxiliary unit 4 is furnished with a hot water production device 50 for recovering the heat of exhaust gas from fuel cell module 2. Tap water is supplied to this hot water production device 50; this tap water becomes hot water by the heat of the exhaust gas, and is supplied to a hot water tank in an external hot water device, not shown.

In addition, an inverter 54, which is a power extraction section (electrical power conversion section) for supplying power generated by the fuel cell module 2 to the outside, is connected to fuel cell module 2.

Figure 2:
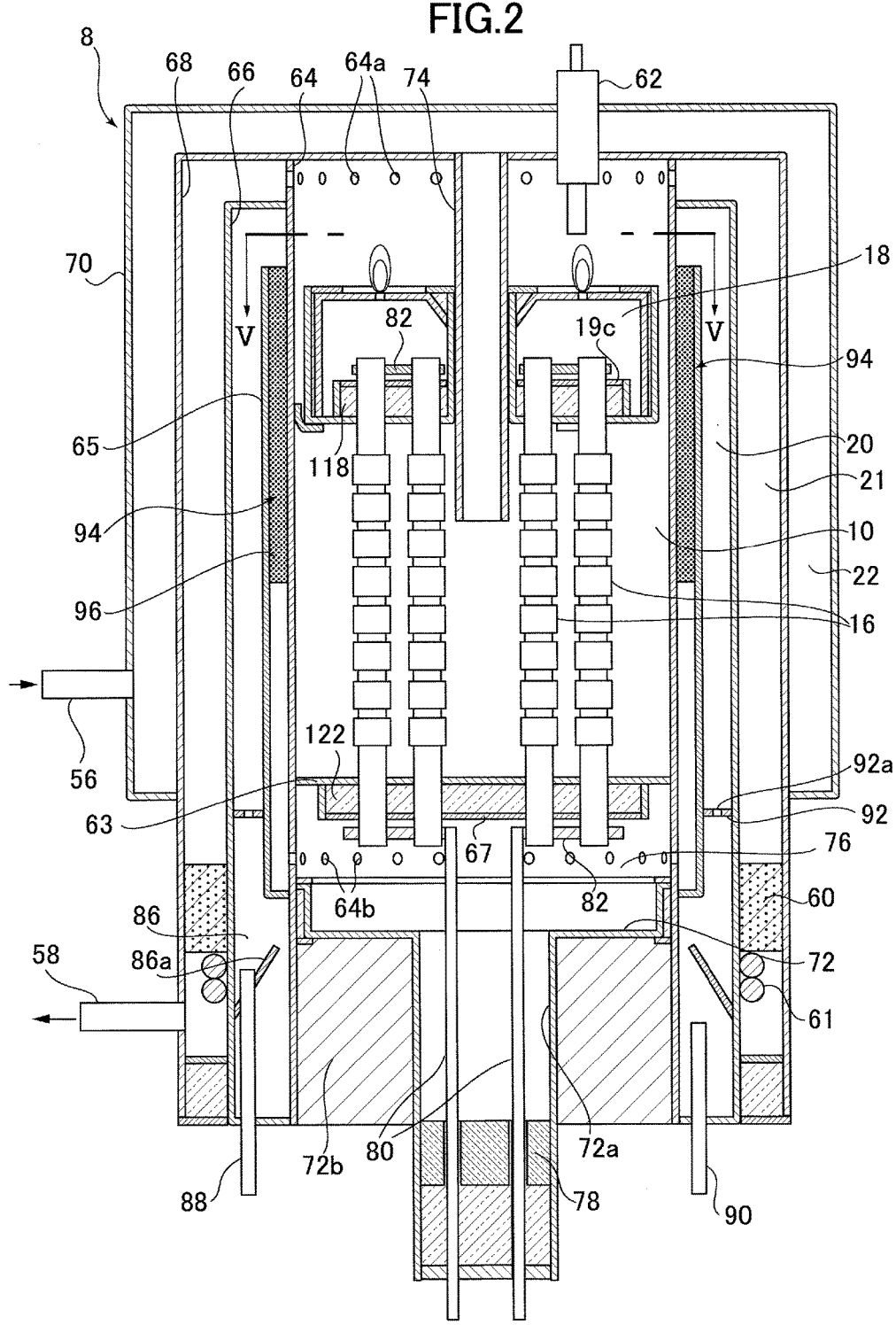
FIG. 2: A cross section of an individual fuel cell housing container built into the solid oxide fuel cell device according to an embodiment of the present invention.
Figure 3:
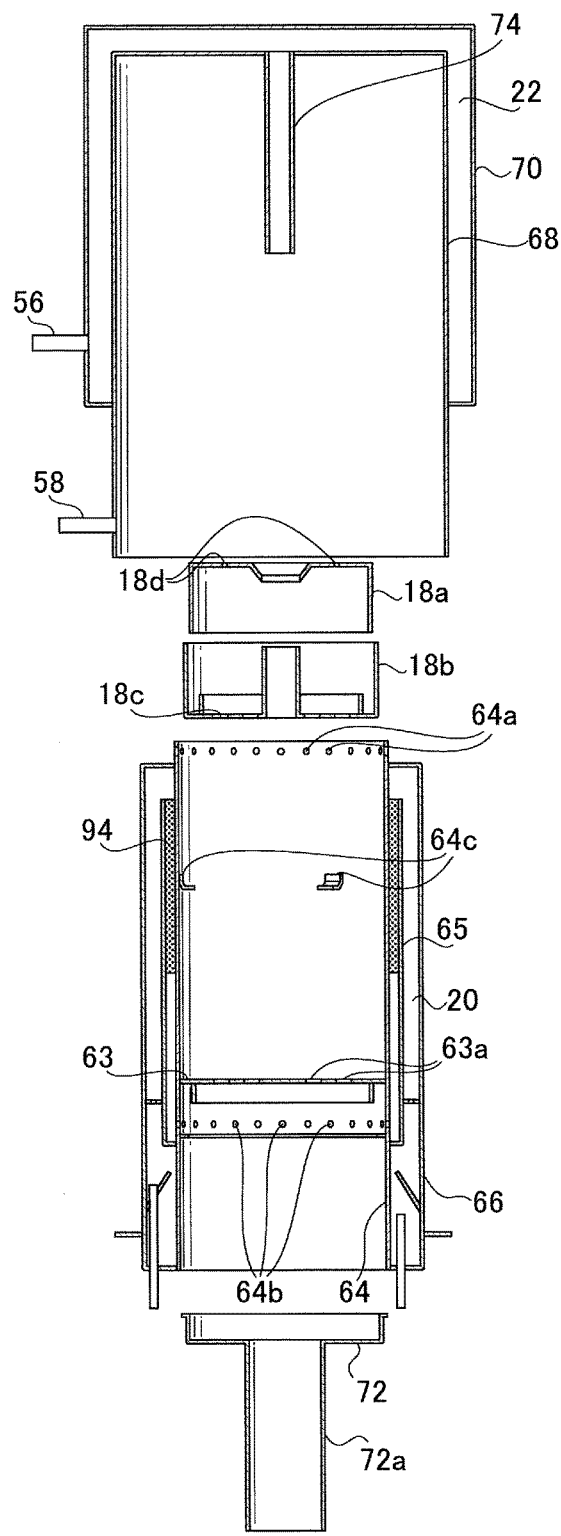
FIG. 3: A cross section showing an exploded view of the main members of the individual fuel cell housing container built into the solid oxide fuel cell device according to an embodiment of the present invention.

Next, referring to FIGS. 2 and 3, we discuss the internal structure of the fuel cell housing container built into the fuel cell module of the solid oxide fuel cell (SOFC) device according to an embodiment of the present invention.

FIG. 2 is a cross-section of the fuel cell housing container, and FIG. 3 is a cross-section showing a disassembled view of main members of the fuel cell housing container.

As shown in FIG. 2, a plurality of individual fuel cells 16 are concentrically arrayed in the space within fuel cell holding container 8, formed so as to surround it concentrically; represented in order are fuel gas supply flow path 20, being a fuel flow path, exhaust gas discharge flow path 21, and oxidant gas supply flow path 22. Here, exhaust gas discharge flow path 21 and oxidant gas supply flow path 22 function as an oxidant gas flow path for discharging/supplying oxidant gas.

First, as shown in FIG. 2, fuel cell holding container 8 is an approximately cylindrical sealed container; connected to the side surface thereof are an oxidant gas introducing pipe 56, being an oxidant gas inflow port for supplying generating air, and an exhaust gas discharge pipe 58 for discharging exhaust gas. In addition, an ignition heater 62 for igniting residual fuel flowing out from exhaust collection chamber 18 protrudes from the top end surface of fuel cell housing container 8.

As shown in FIGS. 2 and 3, inside cylindrical member 64, being a generating chamber constituent member, outside cylindrical member 66, inside cylindrical container 68, and outside cylindrical container 70 are disposed in that order to surround the periphery of individual fuel cells 16 on the inside of fuel cell holding container 8. The above-described fuel gas supply flow path 20, exhaust gas discharge flow path 21, and oxidant gas supply flow path 22 are flow paths respectively constituted between these cylindrical members and cylindrical containers, and heat is exchanged between adjacent flow paths.

That is, exhaust gas discharge flow path 21 is disposed to surround fuel gas supply flow path 20, and oxidant gas supply flow path 22 is disposed to surround exhaust gas discharge flow path 21. The open space at the bottom end of fuel cell housing container 8 is blocked off by an approximately circular dispersion chamber bottom member 72, which forms the bottom surface of fuel gas dispersion chamber 76 for dispersing fuel into each fuel cell 16.

Inside cylindrical member 64 is an approximately cylindrical empty body, open at its top and bottom ends. First affixing member 63, being a dispersion chamber-forming plate, is welded in an airtight manner to the interior wall surface of inside cylindrical member 64. A fuel gas dispersion chamber 76 is defined by the bottom surface of this first affixing member 63, the inside wall surface of inside cylindrical member 64, and the top surface of dispersion chamber bottom member 72. A plurality of insertion holes 63a, into which individual fuel cells 16 are inserted, are formed on first affixing member 63, and each fuel cell 16 is adhered to first affixing member 63 by ceramic adhesive, with the individual fuel cells 16 inserted into each of the insertion holes 63a. Thus in the solid oxide fuel cell device 1 of the embodiment, ceramic adhesive is filled into the mutual joining portions between members constituting fuel cell module 2, and with hardening, each of the members is mutually joined in an airtight manner.

Outside cylindrical member 66 is a cylindrical pipe disposed around inside cylindrical member 64, formed to have an approximately similar shape to inside cylindrical member 64 so that an annular flow path is formed between outside cylindrical member 66 and inside cylindrical member 64. In addition, an intermediate cylindrical member 65 is disposed between inside cylindrical member 64 and outside cylindrical member 66. Intermediate cylindrical member 65 is a cylindrical pipe disposed between inside cylindrical member 64 and outside cylindrical member 66; a reforming section 94 is constituted between the outer periphery of inside cylindrical member 64 and the inner periphery of intermediate cylindrical member 65. Also, the annular space between the outer periphery surface of intermediate cylindrical member 65 and the inner periphery surface of outside cylindrical member 66 functions as a fuel gas supply flow path 20. Therefore reforming section 94 and fuel gas supply flow path 20 receive heat from heat generation of individual fuel cells 16 and combustion of residual fuel at the top end of exhaust collection chamber 18. The top end portion of inside cylindrical member 64 and top end portion of outside cylindrical member 66 are joined in an airtight manner by welding, while the top end of fuel gas supply flow path 20 is closed off. Also, the bottom end of intermediate cylindrical member 65 and the outer periphery surface of inside cylindrical member 64 are joined in an airtight manner by welding.

Inside cylindrical container 68 is a cup-shaped member, circular in section, disposed around outside cylindrical member 66, the side surface of which is formed to have an approximately similar shape to outside cylindrical member 66, so that an annular flow path of approximately fixed width is formed between inside cylindrical container 68 and outside cylindrical member 66. This inside cylindrical container 68 is disposed to cover the open portion at the top end of inside cylindrical member 64. The annular space between the outer periphery surface of outside cylindrical member 66 and the inner periphery surface of inside cylindrical container 68 functions as exhaust gas discharge flow path 21 (FIG. 2). This exhaust gas discharge flow path 21 communicates with the space within inside cylindrical member 64 through a plurality of small holes 64a in the top end portion of inside cylindrical member 64. Exhaust gas discharge pipe 58, being an exhaust gas discharge port, is connected at the lower portion side surface of inside cylindrical container 68, and exhaust gas discharge flow path 21 communicates with exhaust gas discharge pipe 58.

A combustion catalyst 60 and a sheath heater 61 for heating the combustion catalyst is disposed on the bottom portion of exhaust gas discharge flow path 21.

Combustion catalyst 60 is a catalyst filled into the annular space between the outer periphery surface of outside cylindrical member 66 and the inner periphery surface of inside cylindrical container 68, above exhaust gas discharge pipe 58. By passing through combustion catalyst 60, carbon monoxide is removed from exhaust gas descending the exhaust gas discharge flow path 21 to be discharged from exhaust gas discharge pipe 58.

Sheath heater 61 is an electrical heater attached to surround the outer periphery surface of outside cylindrical member 66 at the bottom of combustion catalyst 60. Upon startup of solid oxide fuel cell device 1, combustion catalyst 60 is heated to an activation temperature by energizing sheath heater 61.

Outside cylindrical container 70 is a cup-shaped member, circular in cross section, disposed around inside cylindrical container 68, the side surface of which is formed to have an approximately similar shape to inside cylindrical container 68, so that an annular flow path of approximately fixed width is formed between outside cylindrical container 70 and inside cylindrical container 68. The space between the outer periphery surface of inside cylindrical container 68 and the inner periphery surface of outside cylindrical container 70 functions as oxidant gas supply flow path 22.

Oxidant gas introducing pipe 56 is connected to the lower portion side surface of outside cylindrical container 70; oxidant gas supply flow path 22 communicates with oxidant gas introducing pipe 56.

Dispersion chamber bottom member 72 is an approximately circular plate-shaped member, affixed to the inside wall surface of inside cylindrical member 64 with a ceramic adhesive in an airtight manner. A fuel gas dispersion chamber 76 is thus constituted between first affixing member 63 and dispersion chamber bottom member 72. Also, insertion pipe 72a for the insertion of bus bars 80 (FIG. 2) is provided at the center of dispersion chamber bottom member 72. Bus bars 80, electrically connected to each individual fuel cell 16, are routed out to the outside of fuel cell housing container 8 through this insertion pipe 72a. Ceramic adhesive is filled into insertion pipe 72a, thereby securing the airtightness of fuel gas dispersion chamber 76. In addition, heat storage material 72b (FIG. 2) is disposed around the periphery of insertion pipe 72a.

An oxidant gas injecting pipe 74 for injecting generating air, circular in cross section, is attached so as to hang down from the ceiling surface of inside cylindrical container 68. This oxidant gas injecting pipe 74 then extends in the vertical direction on the center axial line of inside cylindrical container 68, and each fuel cell 16 is disposed on concentric circles around oxidant gas injecting pipe 74. By attaching the top end of oxidant gas injection pipe 74 to the ceiling surface of inside cylindrical container 68, oxidant gas supply flow path 22, formed between inside cylindrical container 68 and external cylindrical container 70, is made to communicate with oxidant gas injection pipe 74. Air supplied via oxidant gas supply flow path 22 is injected downward from the tip of oxidant gas injecting pipe 74, hitting the top surface of first affixing member 63 and spreading to the entire interior of generating chamber 10.

Fuel gas dispersion chamber 76 is a cylindrical airtight chamber constituted between first affixing member 63 and dispersion chamber bottom member 72, on the top surface of which each of the fuel cells 16 are stood in close proximity. The inside fuel electrode of each individual fuel cell 16 attached to the top surface of first affixing member 63 communicates with the interior of fuel gas dispersion chamber 76. The bottom end portion of each individual fuel cell 16 penetrates the insertion holes 63a in first affixing member 63 and projects into fuel gas dispersion chamber 76, so that each fuel cell 16 is affixed by adhesion to first affixing member 63.

As shown in FIG. 2, a plurality of small holes 64b are provided on inside cylindrical member 64 at a position below first affixing member 63. The space between the outer periphery of inside cylindrical member 64 and the inner periphery of intermediate cylindrical member 65 communicates with the inside of fuel gas dispersion chamber 76 through a plurality of small holes 64b. Supplied fuel first rises through the space between the inner periphery of outside cylindrical member 66 and the outer periphery of intermediate cylindrical member 65, then descends through the space between the outer periphery of inside cylindrical member 64 and the inner periphery of intermediate cylindrical member 65, flowing into fuel gas dispersion chamber 76 through a plurality of small holes 64b. Fuel gas which has flowed into fuel gas dispersion chamber 76 is distributed to fuel electrode of each individual fuel cell 16 attached to the ceiling surface of fuel gas dispersion chamber 76 (first affixing member 63).

Figure 4:
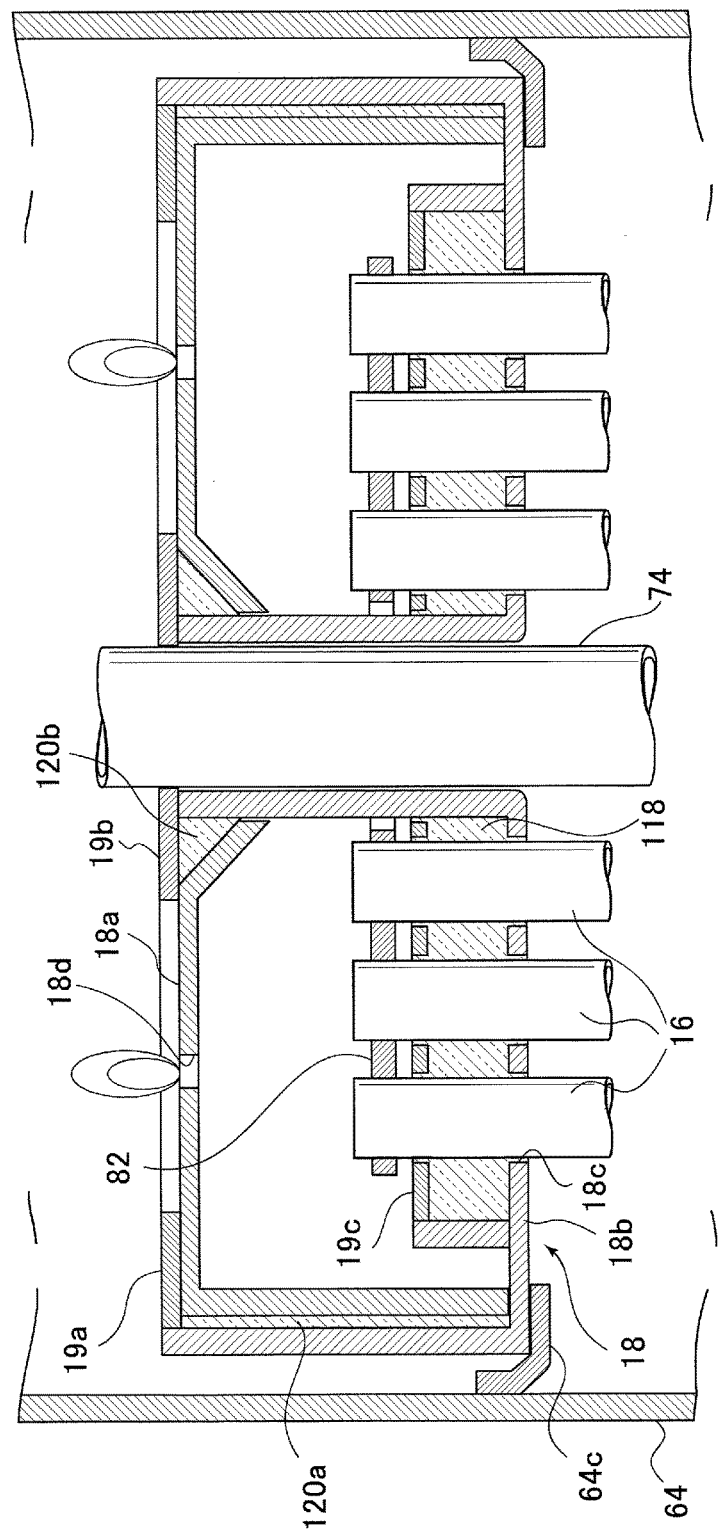
FIG. 4: A cross section showing an expanded view of the exhaust collection chamber built into the solid oxide fuel cell device according to an embodiment of the present invention.

In addition, the bottom end portions of the individual fuel cells 16 projecting inside fuel gas dispersion chamber 76 are electrically connected to bus bars 80 inside fuel gas dispersion chamber 76, and power is extracted to the outside through electrical conductor conduit 72a. Bus bars 80 are elongated metal conductors for extracting power produced by each fuel cell 16 to the outside of fuel cell housing container 8, affixed to insertion pipe 72a of dispersion chamber bottom member 72 through glass 78. Bus bars 80 are electrically connected to a current collector 82 attached to each fuel cell 16 on the interior of fuel gas dispersion chamber 76. Bus bars 80 are also connected on the outside of fuel cell housing container 8 to the inverter 54 (FIG. 1). Note that current collector 82 is also attached to the top end portions of each fuel cell 16 projecting into exhaust collection chamber 18 (FIG. 4). A plurality of individual fuel cells 16 are electrically connected in parallel by these current collectors 82 at the top and bottom end portions, and a plurality of sets of parallel-connected individual fuel cells 16 are electrically connected in series, with both ends of these series connections connected to respective bus bars 80.

Figure 5:
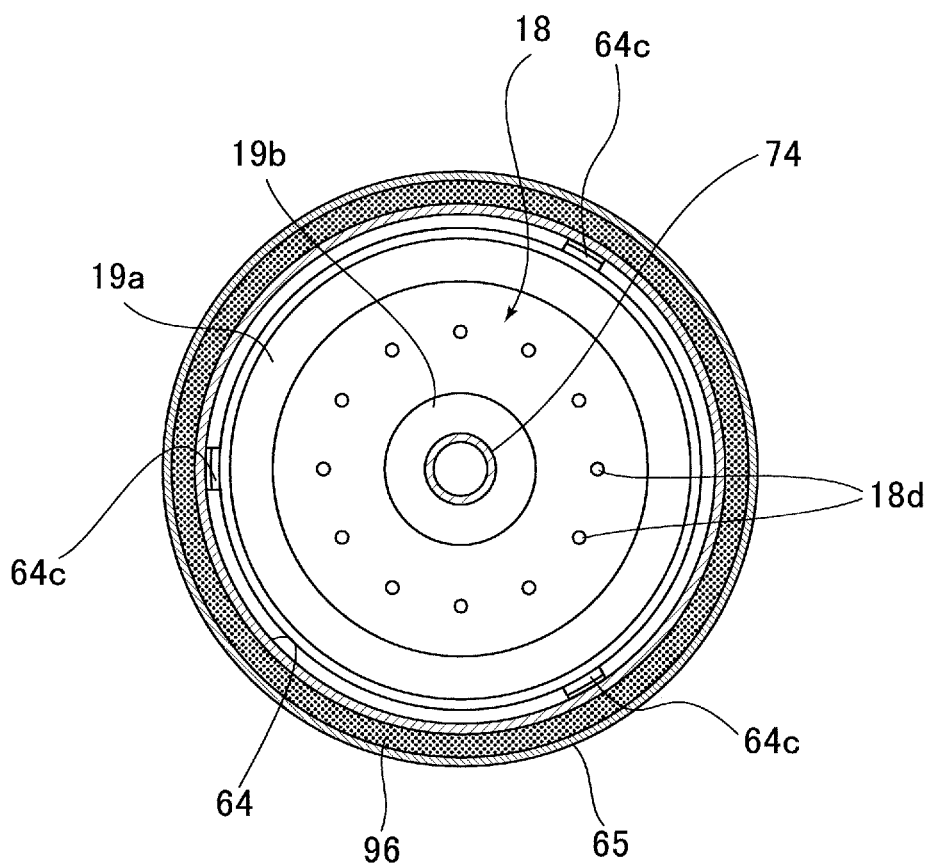
FIG. 5: A cross section through V-V in FIG. 2.

Next, referring to FIGS. 4 and 5, we explain the constitution of the exhaust collection chamber.

FIG. 4 is a cross section showing an expanded view of the exhaust collection chamber part; FIG. 5 is a cross section through V-V in FIG. 2.

As shown in FIG. 4, exhaust collection chamber 18 is a chamber with a donut-shaped cross section attached to the top end portion of each fuel cell 16; the oxidant gas injection pipe 74 penetrates and extends at the center of this exhaust collection chamber 18.

As shown in FIG. 5, three stays 64c for supporting exhaust collection chamber 18 are attached at equal spacing on the inside wall surface of inside cylindrical member 64. As shown in FIG. 4, stays 64c are small tabs of bent thin metal plate; by mounting exhaust collection chamber 18 on each of the stays 64c, exhaust collection chamber 18 is positioned concentrically relative to inside cylindrical member 64. Thus the gap between the outer periphery of exhaust collection chamber 18 and the inner periphery of inside cylindrical member 64, and the gap between the inner periphery of exhaust collection chamber 18 and the outer periphery of oxidant gas injecting pipe 74, are made uniform around the entire circumference (FIG. 5).

Exhaust collection chamber 18 is constituted so that collection chamber upper member 18a and collection chamber lower member 18b are joined in an airtight manner.

Collection chamber lower member 18b is a circular plate-shaped member open at the top, at the center of which a cylindrical portion is formed to allow the penetration of oxidant gas injection pipe 74.

Collection chamber upper member 18a is a circular plate-shaped member open at the bottom, at the center of which an open portion is formed to allow the penetration of oxidant gas injection pipe 74. Collection chamber upper member 18a has a shape capable of insertion into the doughnut shaped cross-sectional region which opens at the top of collection chamber lower member 18b.

A ceramic adhesive is filled into the gap between the inner periphery of the perimeter wall of collection chamber lower member 18b and the outer periphery surface of collection chamber upper member 18a, and hardened, securing the airtightness of this joint portion.

A large diameter seal ring 19a is disposed on the ceramic adhesive layer formed by the ceramic adhesive filled into this joint portion, covering the ceramic adhesive layer. Large diameter seal ring 19a is an annular thin sheet, disposed to cover the filled-in ceramic adhesive layer after the ceramic adhesive is filled, and affixed to exhaust collection chamber 18 by the hardening of the adhesive.

On the other hand, a ceramic adhesive is filled and hardened between the outer periphery surface of the cylindrical portion at the center of collection chamber lower member 18b and the opening edge at the center of collection chamber upper member 18a, securing the airtightness of this joint portion. A small diameter seal 19b is disposed on the ceramic adhesive layer formed by the ceramic adhesive filled into this joint portion, covering the ceramic adhesive layer. The small diameter seal 19b is an annular thin sheet, disposed to cover the filled-in ceramic adhesive layer after the ceramic adhesive is filled, and affixed to exhaust collection chamber 18 by the hardening of the adhesive.

A plurality of round insertion holes 18c are disposed on the bottom surface of collection chamber lower member 18b. The top end portions of each fuel cell 16 respectively penetrate each of the insertion holes 18c, and each fuel cell 16 penetrates each of the insertion holes 18c and extends. As ceramic adhesive is flowed onto the bottom surface of collection chamber lower member 18b, which is penetrated by individual fuel cells 16, and hardened, the gap between the outer periphery of each individual fuel cell 16 and the insertion holes 18c is filled in an airtight manner, and each fuel cell 16 is affixed to collection chamber lower member 18b.

Moreover, a circular thin-plate cover member 19c is disposed on the ceramic adhesive poured onto the bottom surface of collection chamber lower member 18b, and affixed to collection chamber lower member 18b by the hardening of the ceramic adhesive. A plurality of insertion holes are formed in cover member 19c at the same positions as each of the insertion holes 18c in collection chamber lower member 18b, and the top end portions of each fuel cell 16 penetrate and extend through this ceramic adhesive layer and cover member 19c.

At the same time, a plurality of jet ports 18d for jetting collected fuel gas are provided on the ceiling surface of exhaust collection chamber 18 (FIG. 5). Each of the jet ports 18d is disposed in a circle on collection chamber upper member 18a. Fuel remaining unused for electrical generation flows out from the top end of each fuel cell 16 into exhaust collection chamber 18, and fuel collected inside exhaust collection chamber 18 flows out from jet ports 18d, where it is combusted.

Next, referring to FIG. 2, we discuss a structure for reforming raw fuel gas supplied from fuel supply source 30.

First, a vaporizing section 86 for vaporizing water for steam reforming is provided at the lower portion of fuel gas supply flow path 20, which is constituted by the space between inside cylindrical member 64 and outside cylindrical member 66. Vaporizing section 86 is formed of ring-shaped tilted plate 86a attached to the bottom inside circumference of outside cylindrical member 66, and water supply pipe 88. Vaporizing section 86 is also disposed above exhaust gas discharge pipe 58, which discharges exhaust gas, and below oxidant gas introducing pipe 56 for introducing electrical generating air. Tilted plate 86a is thin metal plates formed in a ring shape, the outside perimeter edge of which is attached to the inside wall surface of outside cylindrical member 66. The inside perimeter edge thereof, on the other hand, is positioned above the outside perimeter edge, and a gap is provided between the inside perimeter edge of tilted plate 86*a* and the outside wall surface of inside cylindrical member 64.

Water supply pipe 88 is a pipe extending from the bottom end of inside cylindrical member 64 in a vertical direction within fuel gas supply flow path 20; water for steam reforming supplied from water flow rate regulator unit 28 is supplied to vaporizing section 86 through water supply pipe 88. The top end of water supply pipe 88 penetrates tilted plate 86*a* and extends up to the top surface side of tilted plate 86*a*; water supplied to the top surface side of tilted plate 86*a* accumulates between the top surface of tilted plate 86*a* and the inside wall surface of outside cylindrical member 66. Water supplied to the top surface of tilted plate 86*a* is vaporized there to produce steam.

Also, a fuel gas introducing portion for introducing raw fuel gas into fuel gas supply flow path 20 is placed below vaporizing section 86. Raw fuel gas fed from fuel blower 38 is introduced into fuel gas supply flow path 20 via a fuel gas supply pipe 90. Fuel gas supply pipe 90 is a pipe extending vertically inside fuel gas supply flow path 20 from the bottom end of inside cylindrical member 64.

The top end of fuel gas supply pipe 90 is positioned below tilted plate 86*a*. Raw fuel gas fed from fuel blower 38 is introduced at the bottom side of tilted plate 86*a* and rises to the top side of tilted plate 86*a* as its flow path is constricted by the inclination of tilted plate 86*a*. Raw fuel gas rising to the top side of tilted plate 86*a* rises together with the steam produced by vaporizing section 86.

A fuel gas supply flow path partition 92 is provided above vaporizing section 86 inside fuel gas supply flow path 20. Fuel gas supply flow path partition 92 is an annular metal plate disposed to separate into top and bottom portions the annular space between the inner periphery of outside cylindrical member 66 and the outer periphery of intermediate cylindrical member 65. A plurality of equally spaced injection ports 92*a* are provided in a circle on this fuel gas supply flow path partition 92, and the spaces above and below fuel gas supply flow path partition 92 communicate by means of these injection ports 92*a*. Raw fuel gas introduced from fuel gas supply pipe 90 and steam produced by vaporizing section 86 are first pooled in the space on the bottom side of fuel gas supply flow path partition 92, then passed through each of injection ports 92*a* and injected into the space on the top side of fuel gas supply flow path partition 92. When injected into the wide space on the top side of fuel gas supply flow path partition 92 from each of the injection ports 92*a*, the raw fuel gas and steam are suddenly decelerated and here sufficiently mixed.

In addition, reforming section 94 is provided at the top portion of the annular space between the inner periphery of intermediate cylindrical member 65 and the outer periphery of inside cylindrical member 64. Reforming section 94 is disposed to surround the top portion of each fuel cell 16 and the periphery of the exhaust collection chamber 18 at the top thereof. Reforming section 94 comprises a catalyst holding plate (not shown) attached to the outer wall surface of inside cylindrical member 64, and a reforming catalyst 96 held in place thereby.

Thus when raw fuel gas and steam, mixed in the space on the top side of fuel gas supply flow path partition 92, make contact with the reforming catalyst 96 filled into reforming section 94, the steam reforming reaction SR shown by Eq. (1) proceeds inside reforming section 94.

$$CmHn + xH_2O \rightarrow aCO_2 + bCO + cH \qquad (1)$$

Fuel gas reformed in reforming section 94 flows downward in the space between the inner periphery of intermediate cylindrical member 65 and the outer periphery of inside cylindrical member 64, then flows into fuel gas dispersion chamber 76 and is supplied to each fuel cell 16. The steam reforming reaction SR is an endothermic reaction, however the heat required for the reaction is supplied by the combustion heat of off-gas flowing out from exhaust collection chamber 18, and the emitted heat produced in each fuel cell 16.

Figure 6:
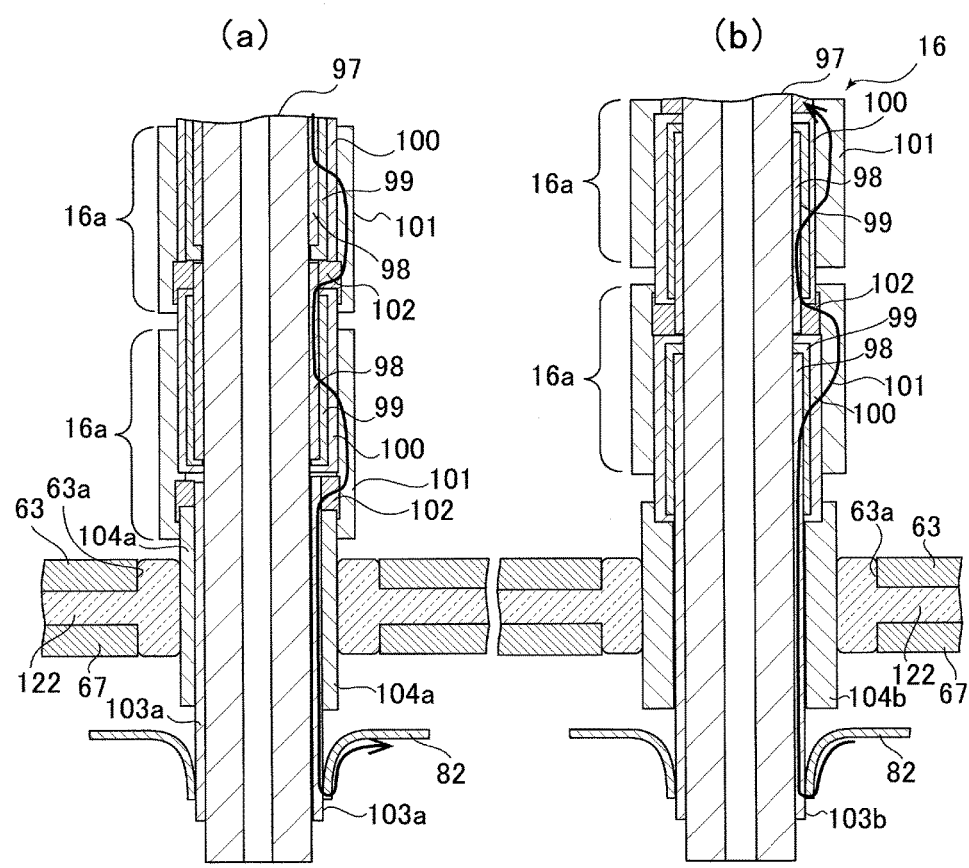
FIG. 6: (a) A cross section showing an expanded view of the bottom end portion of an individual fuel cell on which the bottom end is used as a cathode; and (b) a cross section showing an expanded view of the bottom end portion of an individual fuel cell on which the bottom end is used as an anode.

Next, referring to FIG. 6, we explain individual fuel cells 16.

In the solid oxide fuel cell device 1 according to an embodiment of the present invention, cylindrical lateral band cells using solid oxides are employed for fuel cells 16. A plurality of single cells 16*a* are arranged in lateral band form on each individual fuel cell 16, and each individual fuel cell 16 is constituted by electrically connecting these single cells together in series. Each fuel cell 16 comprises an anode (positive electrode) at one end and a cathode (negative electrode) at the other end; of the plurality of individual fuel cells 16, half are disposed so that the top end is an anode and the bottom end is a cathode, while the other half are disposed so that the top end is a cathode and the bottom end is an anode.

FIG. 6(*a*) is a cross section showing an expanded view of the bottom end portion of an individual fuel cell 16 on which the bottom end is used as a cathode; and FIG. 6 (*b*) is a cross section showing an expanded view of the bottom end portion of an individual fuel cell 16 on which the bottom end is used as an anode.

As shown in FIG. 6, an individual fuel cell 16 is formed of an elongated cylindrical porous support body 97, and a plurality of layers formed in a lateral band shape on the outside of this porous support body 97. In the following order, starting from the inside, fuel electrode 98, reaction suppression layer 99, solid electrolyte layer 100, and air electrode 101 are respectively formed in a lateral band shape surrounding porous support body 97. Therefore fuel gas supplied via fuel gas dispersion chamber 76 flows into the porous support body 97 of each individual fuel cell 16, and air jetted from oxidant gas injection pipe 74 flows to the outside of air electrode 101. Each of the single cells 16*a* formed on the individual fuel cells 16 is comprised of one set of a fuel electrode 98, a reaction suppression layer 99, a solid electrolyte layer 100, and an air electrode 101. The fuel electrode 98 in a single cell 16*a* is electrically connected to the air electrode 101 of the adjacent single cell 16*a* through interconnector layer 102. In this manner, the plurality of single cells 16*a* formed on a single individual fuel cell 16 are electrically connected in series.

As shown in FIG. 6(*a*), electrode layer 103*a* is formed on the outer periphery of porous support body 97 at the cathode-side end portion of individual fuel cells 16, and a lead film layer 104*a* is formed on the outside of this electrode layer 103*a*. In the cathode-side end portion, the air electrode 101 of single cells 16*a* positioned at the end portions and electrode layer 103*a* are electrically connected by interconnector layer 102. The electrode layer 103*a* and the lead film layer 104*a* are formed to penetrate first affixing member 63 at the end portion of individual fuel cells 16, and to protrude further downward than first affixing member 63. Electrode layer 103*a* is formed further down than lead film layer 104*a*, and current collector 82 is electrically connected to electrode layer 103*a* exposed to the outside. Thus air electrodes 101 of single cells 16*a* positioned at the end portions are connected to current collector 82 through interconnector layer 102 and electrode layer 103a, and electrical current flows as shown by the arrow in the diagram. Ceramic adhesive is filled into the gap between the edge of the insertion holes 63a on first affixing member 63 and lead film layer 104a, and individual fuel cells 16 are affixed to first affixing member 63 on the outer periphery of lead film layer 104a.

As shown in FIG. 6(b), fuel electrode layer 98 of a single cell 16a positioned on the end portion extends at the anode-side end portion of individual fuel cells 16, and the extending portion of fuel electrode layer 98 functions as electrode layer 103b. Lead film layer 104b is formed on the outside of electrode layer 103b.

The electrode layer 103b and the lead film layer 104b are formed to penetrate first affixing member 63 at the end portion of individual fuel cells 16, and to protrude further downward than first affixing member 63.

Electrode layer 103b is formed further down than lead film layer 104b, and current collector 82 is electrically connected to electrode layer 103b exposed to the outside. Thus the fuel electrode 98 of single cell 16a positioned at the end portion is connected to current collector 82 through integrally formed electrode layer 103b, and electrical current flows as shown by the arrow in the diagram. Ceramic adhesive is filled into the gap between the edge of the insertion holes 63a on first affixing member 63 and lead film layer 104b, and individual fuel cells 16 are affixed to first affixing member 63 on the outer periphery of lead film layer 104b.

In FIGS. 6(a) and (b) we explained the constitution of the bottom end portion of individual fuel cells 16; the top end portion of individual fuel cells 16 is the same. Note that at the top end portion, individual fuel cells 16 are affixed to the collection chamber lower member 18b of exhaust collection chamber 18; the constitution of the affixing portion is the same as the affixing to the first affixing member 63 at the bottom end portion thereof.

Next we explain the constitution of porous support body 97 and of each layer.

In the embodiment, porous support body 97 is formed by extruding and sintering a mixture of forsterite powder and a binder.

In the embodiment, fuel electrode 98 is an electrically conductive thin film comprised of a mixture of NiO powder and 10YSZ (10 mol % $Y_2O_3$-90 mol % $ZrO_2$) powder.

In the embodiment, reaction suppression layer 99 is a thin film comprising cerium compound oxide (LDC 40; i.e., 40 mol % $La_2O_3$-60 mol % $CeO_2$) or the like, by which chemical reactions between fuel electrode 98 and solid electrolyte layer 100 are suppressed. In the embodiment, solid electrolyte layer 100 is a thin film formed of an LSGM powder having a composition of $La_{0.9}Sr_{0.1}Ga_{0.8}Mg_{0.2}O_3$. Electrical energy is produced by the reaction between oxide ions and hydrogen or carbon monoxide through this solid electrolyte layer 100.

In the embodiment, air electrode 101 is an electrically conductive thin film formed of a powder having a composition of $La_{0.6}Sr_{0.4}Co_{0.8}Fe_{0.2}O_3$.

In the embodiment, interconnector layer 102 is an electrically conductive thin film formed of SLT (lanthanum doped strontium titanate). Adjacent single cells 16a on individual fuel cells 16 are connected via interconnector layer 102.

In the embodiment, electrode layers 103a and 103b are formed of the same material as fuel electrode 98.

In the embodiment, lead film layers 104a and 104b are formed of the same material as solid electrolyte layer 100.

Note that lead film layers 104a, 104b are dense layers, the same as solid electrolyte layer 100, therefore airtightness is secured by adhesion with the ceramic adhesive.

In this embodiment electrode layers 103a and 103b are formed of the same porous material as fuel electrode layer 98, but without limitation thereto electrode layers 103a and 103b may also be formed of other electrically conductive porous materials containing the same porous material as reaction suppression layer 99 or air electrode layer 101. For example, the air electrode layer 101 of single cell 16a formed at a position closest to the end portion of individual fuel cells 16 may be further extended in the end portion direction, and the extended portion thereof used as an electrode layer.

Next, referring to FIG. 7, we explain the current collector.

FIG. 7 is a diagram viewed from above current collector 82. FIGS. 7(a) and 7(b) respectively depict the current collectors 82A, 82B attached to the top end portion and the bottom end portion of individual fuel cells 16. FIG. 7(c) is an expanded view of the attaching holes 84 formed in current collectors 82A, 82B.

Current collector 82 is formed by machining a thin sheet material with elasticity and electrical conductivity. In this embodiment, it is formed using a nickel plate material.

Current collector 82A comprises two approximately semi-circular current collector plates 83a, 83b. By disposing these current collector plates 83a, 83b adjacently, current collector 82A has an approximately circular outer shape, and a circular opening is formed at the center thereof for inserting oxidant gas injection pipe 74.

Current collector 82B comprises one approximately semi-circular current collector plate 83c and two approximately quadrant-shaped current collector plates 83d, 83e. By disposing these current collector plates 83c-83e adjacently, current collector 82B has an approximately circular outer shape, and a circular opening is formed at the center thereof. Connecting portions 83f, 83g for connecting bus bars 80 are provided on current collector plates 83d, 83e.

In the present embodiment, a plurality of (76 in this example) individual fuel cells 16 are divided into four groups of 19. As shown in FIG. 2, when current collector 82 is connected to the top end and bottom end portions of individual fuel cells 16, the individual fuel cells 16 in each group are connected in parallel through current collector 82, and the four groups are connected in series. That is, if the current collector plate 83d connected to one of the bus bars 80 is assumed to be an anode (positive electrode), for example, the bottom half of current collector plate 83a becomes a cathode (negative electrode) through the first group of individual fuel cells 16 connected to current collector plate 83d, the top half becomes an anode, and the left half of current collector plate 83c becomes a cathode through the second group of individual fuel cells 16. Similarly, the right half of current collecting plate 83c becomes an anode, the top half of current collector plate 83b becomes a cathode through the third group of individual fuel cells 16, and finally the current collector plate 83e connected to the other bus bar 80 becomes a cathode through the fourth group of individual fuel cells 16.

As shown in FIG. 7(c), the attaching holes 84 in each current collector plate are formed by the machining of radial notches. One attaching hole 84 is formed by 6 notch lines. An imaginary line 84b connecting both ends of the notch lines forms a circle larger than the outside dimension (imaginary line 84c) of individual fuel cell 16. Using these notch lines, 12 elastic pieces 84a are formed so as to extend toward the center of the circle (toward the inside of the diameter) from the imaginary line 84*b* (i.e., the inside perimeter edge of attaching hole 84).

Each elastic piece 84*a* is approximately fan shaped, tapering toward the tip, and the tip portion thereof can elastically bend relative to the base end portion (imaginary line 84*b*). Therefore when an individual fuel cell 16 is inserted into an attaching hole 84, the tip portion of elastic piece 84*a* contacts the outer periphery surface of the individual fuel cell 16 and bends along its outer periphery surface, and elastic piece 84*a* elastically engages the individual fuel cell 16. When an individual fuel cell 16 is inserted into the current collector to a predetermined position, the current collector is held to the individual fuel cell 16 by the elastic force of elastic pieces 84*a*.

Next, referring to FIGS. 1 and 2, we explain the operation of solid oxide fuel cell device 1.

First, in the startup step of the solid oxide fuel cell device 1, fuel blower 38 is started and supply of fuel is commenced, while sheath heater 61 is also energized. By energizing sheath heater 61, the combustion catalyst 60 disposed above sheath heater 61 is heated, and the vaporization section 86 disposed inside is also heated. Fuel supplied by fuel blower 38 flows from fuel gas supply pipe 90 via desulfurizer 36, heat exchanger 34, and electromagnetic valve 35 into the interior of fuel cell housing container 8. In-flowing fuel, after rising up to the top end within fuel gas supply flow path 20, drops down within reforming section 94, then through small holes 64*b* placed on the bottom portion of inside cylindrical member 64, and into fuel gas dispersion chamber 76. Note that immediately after the startup step of the solid oxide fuel cell device 1, because the temperature of reforming catalyst 96 in reforming section 94 has not risen sufficiently, no fuel reforming is performed.

Fuel gas which has flowed into fuel gas dispersion chamber 76 flows through the inside (the fuel electrode side) of each fuel cell 16 attached to first affixing member 63 of fuel gas dispersion chamber 76, then into exhaust collection chamber 18. Note that immediately after the startup of the solid oxide fuel cell device 1, the temperature of each fuel cell 16 has not risen sufficiently, nor is power being extracted to inverter 54, therefore no electrical generating reaction occurs.

Fuel flowing into exhaust collection chamber 18 is jetted out from jet ports 18*d* in exhaust collection chamber 18. Fuel jetted from jet ports 18*d* is ignited by ignition heater 62 and combusted. Reforming section 94, disposed around exhaust collection chamber 18, is heated by this combustion. Exhaust gas produced by combustion flows into exhaust gas discharge flow path 21 through small holes 64*a* formed in the top portion of inside cylindrical member 64. High temperature exhaust gas descends within exhaust gas discharge flow path 21, heating fuel flowing in the fuel gas supply flow path 20 disposed on the inside thereof and generating air flowing in the oxidant gas supply flow path 22 disposed on the outside thereof. In addition, exhaust gas passes through combustion catalyst 60 disposed within exhaust gas discharge flow path 21, whereby carbon monoxide is removed, then passes through exhaust gas discharge pipe 58 to be discharged from fuel cell housing container 8.

When vaporization section 86 is heated by exhaust gas and sheath heater 61, water for steam reforming supplied to vaporization section 86 is vaporized and steam is produced. Water for steam reforming is supplied by water flow rate regulator unit 28 to vaporization section 86 in fuel cell housing container 8 via water supply pipe 88. The steam produced by vaporization section 86 and fuel supplied through fuel gas supply pipe 90 are first held in the space on the bottom side of fuel gas supply flow path partition 92 inside fuel gas supply flow path 20, then injected from a plurality of injection ports 92*a* formed in fuel gas supply flow path partition 92. Fuel and steam injected with high force from injection ports 92*a* are well blended by being decelerated in the space on the top side of fuel gas supply flow path partition 92.

Blended fuel and steam rise up within fuel gas supply flow path 20 and flow into reforming section 94. In a state whereby the reforming catalyst 96 of reforming section 94 has risen to a temperature at which reforming is possible, a steam reforming reaction occurs when the mixed gas of fuel and steam passes through reforming section 94, whereby mixed gas is reformed into a hydrogen-rich fuel. Reformed fuel passes through small holes 64*b* and flows into fuel gas dispersion chamber 76. A large number of small holes 64*b* are formed around fuel gas dispersion chamber 76, and sufficient capacity is thus assured for fuel gas dispersion chamber 76, therefore reformed fuel flows in uniformly to the individual fuel cells 16 projecting into fuel gas dispersion chamber 76.

In the meantime air, which is the oxidant gas supplied by air flow regulator unit 45, flows into oxidant gas supply flow path 22 through oxidant gas introducing pipe 56. Air flowing into oxidant gas supply flow path 22 rises up in oxidant gas supply flow path 22 as it is heated by the exhaust gas flowing on the inside thereof. Air rising in oxidant gas supply flow path 22 is gathered at the center of the top end portion in fuel cell housing container 8 and flows into oxidant gas injection pipe 74, which communicates with oxidant gas supply flow path 22. Air flowing into oxidant gas injection pipe 74 is injected from the bottom end thereof into generating chamber 10; the injected air then hits the top surface of first affixing member 63 and spreads throughout the entire generating chamber 10. Air flowing into generating chamber 10 rises up through the gap between the outer periphery wall of exhaust collection chamber 18 and the inner periphery wall of inside cylindrical member 64, and through the gap between the inner periphery wall of exhaust collection chamber 18 and the outer periphery of oxidant gas injection pipe 74.

At this point, a portion of the air flowing over the exterior (air electrode side) of each fuel cell 16 is used for the generating reaction. In addition, a portion of the air which has risen at the top of exhaust collection chamber 18 is used to combust the fuel jetted from jet ports 18*d* of exhaust collection chamber 18. Exhaust gas produced by combustion and air not used for electrical generation or combustion passes through small holes 64*a* and flows into exhaust gas discharge flow path 21. Exhaust gas and air flowing into exhaust gas discharge flow path 21 is discharged after carbon monoxide is removed by combustion catalyst 60.

Thus when each fuel cell 16 rises to approximately 650° C., at which generation is possible, and reformed fuel flows into the interior (fuel electrode side) of each fuel cell 16 and air flows on the outside (air electrode side) thereof, electromotive force is generated by a chemical reaction. In this state, when inverter 54 is connected to bus bars 80, routed out from fuel cell housing container 8, electric power is extracted from each fuel cell 16 and electricity is generated.

In solid oxide fuel cell device 1 of the embodiment, generating air is jetted from the oxidant gas jetting pipe 74 disposed at the center of generating chamber 10 and rises up in generating chamber 10 through the uniform gap between exhaust collection chamber 18 and inside cylindrical member 64 and the uniform gap between exhaust collection chamber 18 and oxidant gas jetting pipe 74. Therefore the flow of air inside generating chamber 10 is essentially a fully axially symmetrical flow, and air flows uniformly around each individual fuel cell 16. Temperature differences between individual fuel cells 16 are thereby suppressed, and a uniform electromotive force can be produced by each individual fuel cell 16.

Next, referring to FIGS. 2-4, 8 and 9, we explain a method for manufacturing the solid oxide fuel cell device 1 according to an embodiment of the present invention.

First, inside cylindrical member 64, intermediate cylindrical member 65, outside cylindrical member 66, and first affixing member 63 are assembled by welding into a single unit (see FIG. 3). Also, reforming catalyst 96 is filled into the reforming section 94 provided between inside cylindrical member 64 and intermediate cylindrical member 65. Furthermore, water supply pipe 88 and fuel gas supply pipe 90 are also attached by welding.

Next, one end portion of individual fuel cells 16 is inserted into insertion holes 63*a* of first affixing member 63, and individual fuel cells 16 are positioned by a fixture or the like relative to first affixing member 63. Following this, the collection chamber lower member 18*b*, being a second affixing member, is disposed on the other end portion side of the positioned individual fuel cells 16.

After thus pouring ceramic adhesive onto collection chamber lower member 18*b* and disposing cover member 19*c* with each fuel cell 16 in a positioned state, the ceramic adhesive is hardened by heating in a drying oven. Ceramic adhesive layer 118 (see FIG. 2) is thus formed. The cell bonding portion between individual fuel cells 16 and collection chamber lower member 18*b* is bonded in an airtight manner by ceramic adhesive layer 118.

Note that each fuel cell 16 is adhered by ceramic adhesive at the lead film layers 104*a* and 104*b* thereof (see FIG. 6).

In the heating step for ceramic adhesive, the temperature inside the drying oven is raised from room temperature to approximately 60° C. in approximately 120 minutes, then raised to approximately 80° C. in approximately 20 minutes, then maintained at approximately 80° C. for approximately 60 minutes. After maintaining the temperature at approximately 80° C., the temperature inside the drying oven is returned to room temperature in approximately 30 minutes.

By this heating step, the ceramic adhesive is hardened to a state at which subsequent manufacturing steps can be implemented. In subsequent steps, the ceramic adhesive is hardened by performing a second heating step to a state able to withstand the temperature rise occurring at the startup step of the solid oxide fuel cell device 1.

Next, the assembly is vertically inverted, ceramic adhesive is poured onto the first affixing member 63 on which the tips of each fuel cell 16 are projecting, and the cover member 67 is disposed, after which the ceramic adhesive is hardened by implementing the above-described heating step in the drying oven. Ceramic adhesive layer 122 (see FIG. 2) is thus formed. The cell bonding portion between individual fuel cells 16 and first affixing member 63 is bonded in an airtight manner by ceramic adhesive layer 122.

Figure 8:
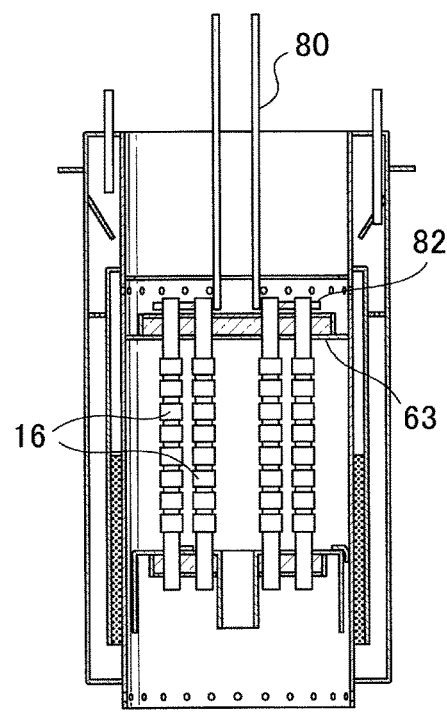
FIG. 8: An explanatory figure of a step in a manufacturing process for the solid oxide fuel cell device according to an embodiment of the present invention.

Next, as shown in FIG. 8, current collector 82 is attached to the tip portions of the individual fuel cells 16 projecting from first affixing member 63 (the bottom end portions when not vertically inverted) and this current collector 82 is connected to bus bars 80. Relative to the cell array comprised of a plurality of individual fuel cells 16, current collector 82 is positioned such that each of the attaching holes 84 is axially above corresponding individual fuel cell 16. Current collector 82 is pressed onto the cell array from above by a predetermined pressing force. Thus the end portions of individual fuel cells 16 are inserted into attaching holes 84, and current collector 82 is attached to the cell array by the elastic force of elastic pieces 84*a* of attaching holes 84.

Next, dispersion chamber bottom member 72 is attached to the assembly. In addition, ceramic adhesive is filled into the annular gap between the outer periphery surface of dispersion chamber bottom member 72 and the inner periphery surface of inside cylindrical member 64. Also, the glass 78 is disposed in insertion tube 72*a* placed at the center of dispersion chamber bottom member 72 and ceramic adhesive is filled into insertion tube 72*a*. Bus bars 80 extending from current collector 82 penetrate this glass 78 and the ceramic adhesive. In this state, the above-described heating step is carried out on the assembly, hardening the ceramic adhesive.

Figure 9:
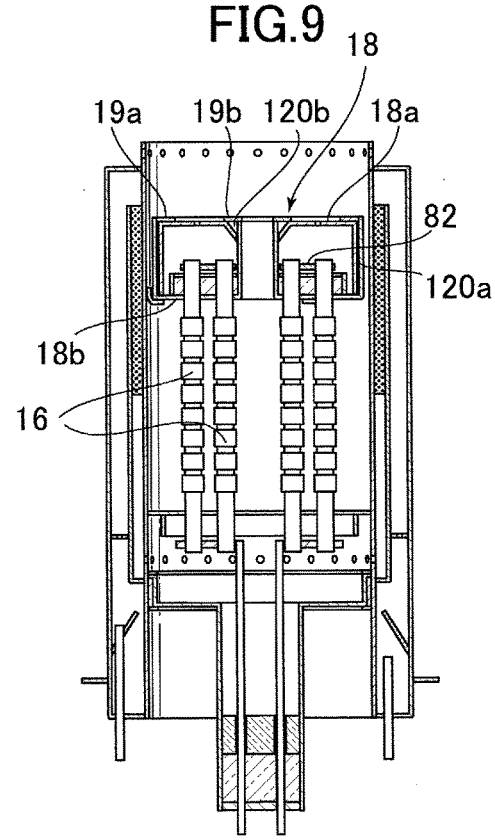
FIG. 9: An explanatory figure of a step in a manufacturing process for the solid oxide fuel cell device according to an embodiment of the present invention.

Next, as shown in FIG. 9, the assembly is vertically inverted and the current collector 82 is attached to the tip portions of the individual fuel cells 16 affixed so as to project out from collection chamber lower member 18*b*. In addition, collection chamber upper member 18*a* is disposed on collection chamber lower member 18*b*, and ceramic adhesive is filled into the gap between collection chamber upper member 18*a* and collection chamber lower member 18*b*. Also, the large diameter seal 19*a* and the small diameter seal 19*b* are disposed on the ceramic adhesive. In this state, the above-described heating step is implemented on the assembly to form ceramic adhesive layers 120*a* and 120*b* (see FIG. 4).

Next, inside cylindrical container 68 and outside cylindrical container 70 are attached to the assembly by welding or ceramic adhesive. Thereafter, ceramic adhesive is filled into the gap between outside cylindrical member 66 and inside cylindrical container 68 and hardened by the above-described heating step. After this heating step, the second heating step is carried out to a still higher temperature (e.g., approximately 650° C.), hardening each ceramic adhesive layer to a state capable of withstanding the temperature rise at the startup step.

The assembly shown in FIG. 2 is manufactured by the aforementioned steps, and finally a reduction step is performed. In this reduction step, a high temperature reduction gas (fuel gas; i.e., hydrogen gas) is supplied from fuel gas supply pipe 90 inside a high temperature (e.g., approximately 650° C.) oven, and reduction gas passes over the fuel electrode side of each fuel cell 16. By this means, fuel electrodes which had oxidized are reduced in a high temperature reduction gas atmosphere so that, for example, the nickel oxide contained in the fuel electrode can be reduced to nickel.

Note that the reduction step may be executed after the assembly is returned to a low temperature following execution of the above-described second heating step, or may be continuously executed following the second heating step, or both steps may be simultaneously executed.

Next, of the steps used to manufacture the solid oxide fuel cell device 1 according to an embodiment of the present invention, we shall explain in detail the method for affixing current collector 82 to a cell array of fuel cells 16.

Figure 10:
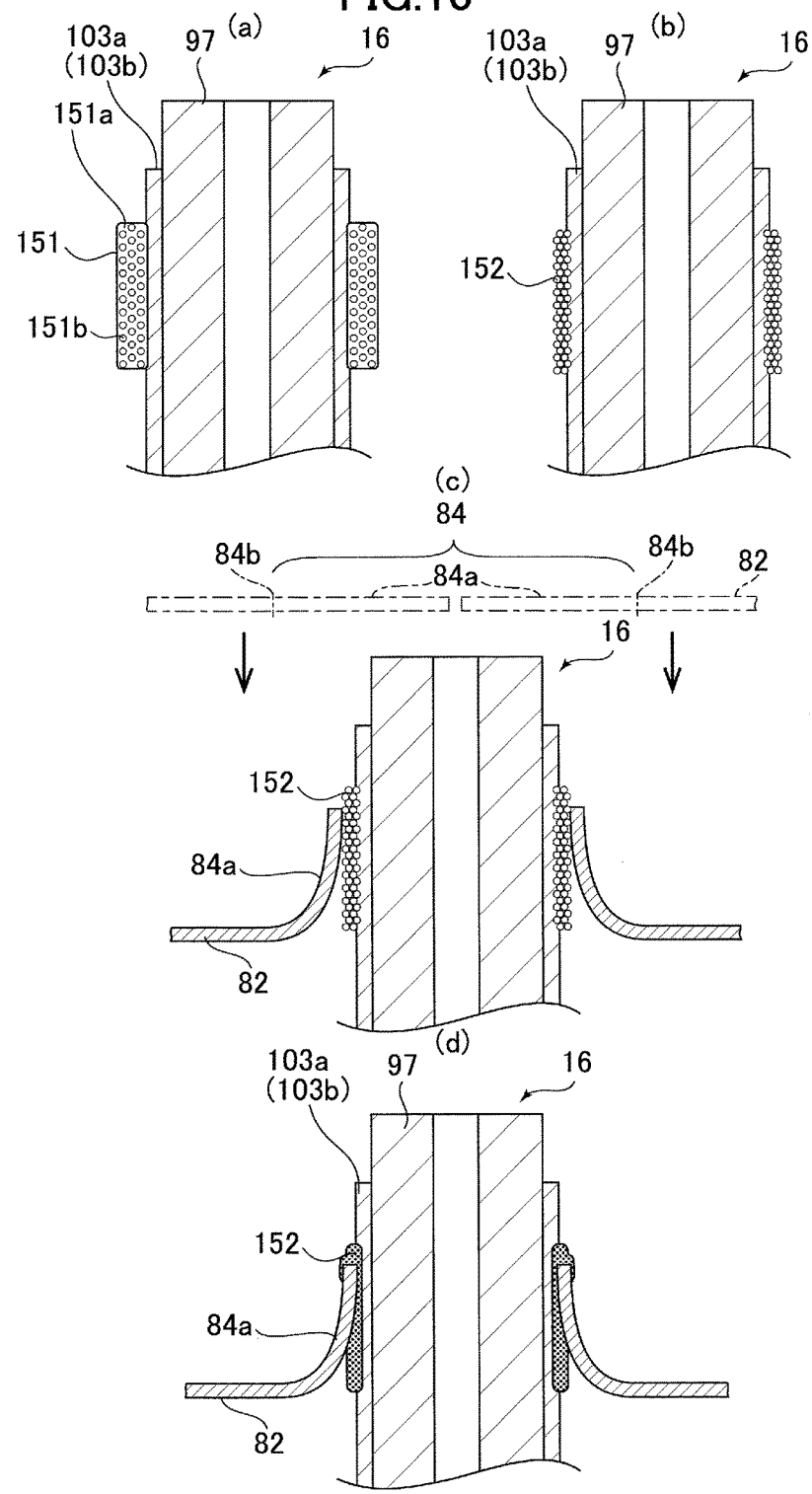
FIG. 10: An explanatory figure of a current collector affixing method pertaining to a first embodiment in a manufacturing process for the solid oxide fuel cell device according to an embodiment of the invention.
Figure 11:
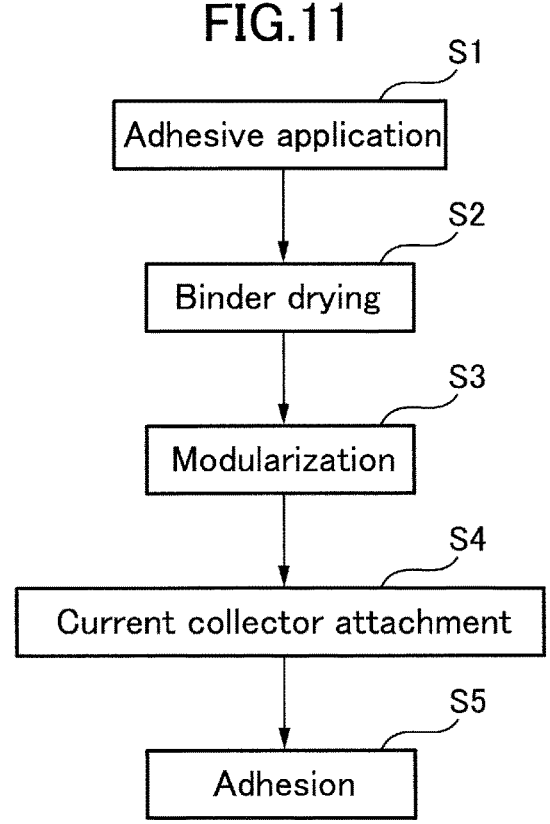
FIG. 11: A flowchart of the current collector affixing method pertaining to the first embodiment.
Figure 12:
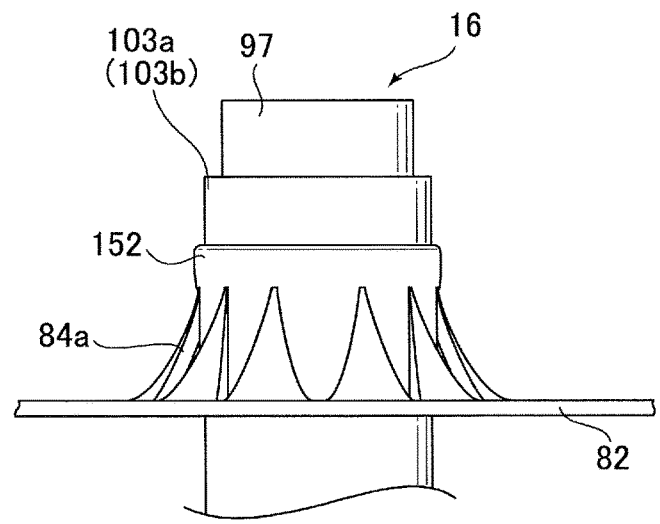
FIG. 12: An explanatory figure showing the state in which the current collector is affixed to the individual fuel cell in the solid oxide fuel cell device according to an embodiment of the present invention.

First, referring to FIGS. 10 through 12, we explain a first embodiment.

FIG. 10 is an explanatory diagram of a method for affixing a current collector; FIG. 11 is a flow chart of an affixing method; and FIG. 12 is an explanatory diagram showing the state in which a current collector is affixed to an individual fuel cell.

Each fuel cell 16 has a cylindrical porous support body 97; fuel electrode layer 98, reaction suppression layer 99, solid electrolyte layer 100, air electrode layer 101, electrode layers 103a and 103b, and lead film layers 104a and 104b are formed on the outer periphery surface of the support body (see FIG. 6).

First, as shown in FIG. 10(a), an electrically conductive adhesive 151 is applied to the exposed surfaces of electrode layers 103a, 103b on both end portions of individual fuel cells 16 (FIG. 11, step S1). This adhesive application step is performed before a plurality of individual fuel cells 16 are modularized into a cell array, i.e., to each fuel cell 16 in a standalone state.

Adhesive 151 in the present embodiment is a mixture of solid powder 151b into a binder component 151a, and is in a paste state prior to hardening. Any of α-terpineol, nonionic surfactant, or a mixture of polyvinyl butyral and polyacetal, for example, may be used as a binder component. The solid powder may be a granular electrically conductive material which sinters at a temperature at or below the operating temperature of solid oxide fuel cell device 1 (e.g., approximately 600° C. or above), for example nickel powder. The average grain size of the powder is set to be approximately the same or less than the pore diameter of the electrode layer, which is a porous body. The powder in the present embodiment has a grain size on the order of μms to several tens of μms. Therefore in the adhesive application step, a portion of binder component 151a and solid powder 151b of the adhesive 151 penetrates into the pores of the electrode layer, which is a porous body, or is disposed to block the openings in the electrode layer pores.

Next, as shown in FIG. 10(b), adhesive 151 is heated and binder component 151a dried (FIG. 11, step S2). This drying step (first hardening step) can dry the binder component 151a in the same way, for example, as the above-described heating step, by disposing the individual fuel cells 16 in an atmosphere of approximately 80° C. inside a drying oven. The drying temperature in the drying step can dry binder component 151a, but is set to a temperature at or below needed to sinter solid powder 151b. Note that the above-described ceramic adhesive heating step may also double as this drying step.

In the drying step, the drying of binder component 151a results in the formation of an electrode protective layer 152, comprised primarily of solid powder 151b, in entire pores of the electrode layer or in pores close to the surface thereof (the electrode protective layer forming step).

The electrode protective layer 152 of the present embodiment primarily comprises fine nickel powder, and is harder than the electrode layer. By covering the electrode layer, the electrode protective layer 152 can protect the electrode layer from outside forces.

Next, by affixing individual fuel cells 16 on which an electrode protective layer 152 is formed, with the fuel cells 16 positioned to first affixing member 63 and collector chamber lower member 18b (see FIG. 8), the cell array composed of a plurality of individual fuel cells 16 is modularized (FIG. 11, step S3).

Next, as shown in FIG. 10(c), a current collector attaching step is performed to attach current collectors 82 to both respective end portions of modularized individual fuel cells 16 (FIG. 11, step S4). Specifically, as shown by the imaginary line in FIG. 10(c), each of the current collector plates 83a-83e of current collector 82 is positioned with respect to the cell array. That is, each current collector plate is disposed so that the center of the attaching holes 84 on current collector 82 is positioned on approximately the axial center of the corresponding individual fuel cell 16. As shown by the solid line in FIG. 10(c), current collector 82 is pressed into the cell array. By this means, individual fuel cells 16 are inserted into the corresponding attaching holes 84. At this point, the plurality of elastic pieces 84a on attaching holes 84 elastically bend along the outer periphery surface of individual fuel cells 16, contacting the outer periphery surface thereof. When each of the current collector plates is pressed into a predetermined position, elastic pieces 84a elastically engage with electrode protective layer 152. Elastic pieces 84a and electrode protective layer 152 are in this way electrically connected.

When current collector 82 is attached to a cell array, current collector 82 moves to a predetermined position as the bending elastic pieces 84a contact electrode protective layer 152 formed on the outer periphery surfaces of fuel cells 16. At this point, the electrode layers of individual fuel cells 16 are covered by an electrode protective layer 152 and therefore protected from damage caused by contact with elastic pieces 84a. Therefore in the present embodiment a current collector 82 comprising elastic pieces 84a having a large elastic force can be used.

Next, as shown in FIG. 10(d), an adhesion step (second hardening step) is executed to adhere elastic pieces 84a and electrode protective layer 152 (FIG. 11, step S5). Specifically, a step is executed whereby electrode protective layer 152 is heated to a temperature at or below the melting point of solid powder 151b, and solid powder 151b is sintered. Sintering causes electrode protective layer 152 to shrink in volume and densify. This sintering step may be executed for only the purpose of adhering current collector 82 and individual fuel cells 16, but the above-described ceramic adhesive second heating step or the reduction step can also double as sintering step. The manufacturing process can be shortened if the second heating step or the reduction step are constituted to double as sintering step.

In this embodiment, nickel powder is used as solid powder 151b. Therefore sintering of solid powder 151b gradually starts from about 250° C., and is completed during the rise to approximately 550° C. As a result, in the second heating step or reduction step doubling as sintering step, the sintering step can, for example, be completed in the process of the gradual temperature rise up to approximately 650° C.

On the other hand, in the present embodiment current collector 82 is formed of nickel plate, and when the temperature of current collector 82 rises, there is a risk that the coefficient of elasticity of the plate material will drop, or that recrystallization will occur, causing elastic force to drop. When elastic force drops due to a drop in the coefficient of elasticity or a drop in elastic force, the pressing force of elastic pieces 84a on electrode protective layer 152 drops, with the risk that contact will be lost between elastic pieces 84a and electrode protective layer 152. The temperature for nickel recrystallization is approximately 530° C. to approximately 660° C.

However, in the present embodiment the material for the current collector 82 and the solid powder 151b contained in adhesive 151 is selected so that the sintering of electrode protective layer 152 is completed or at least partially completed while the nickel plate material of the current collector 82 has elastic force. Specifically, in the present embodiment the grain size, etc. of solid powder 151b is set so that solid powder 151b sinters before the recrystallization of current collector 82. Hence in the sintering step, elastic pieces 84a can be adhered to electrode protective layer 152.

Moreover, in the present embodiment electrode protective layer 152 is formed on the surface of the electrode layer before the current collector attaching step, therefore when attaching a current collector, scratching and damage (peeling) of the electrode layer by elastic pieces 84*a* can be prevented. For this reason elastic pieces 84*a* with a comparatively large elastic force can be used. That is, current collector 82 can be formed from a plate material with a comparatively large sheet thickness. If elastic pieces 84*a* have a high elastic force, a comparatively large elastic force can be maintained by elastic pieces 84*a* even if individual fuel cells 16 and current collector 82 are exposed to high temperatures during operation of solid oxide fuel cell device 1. Thus even if there is no adhesive force in electrode protective layer 152 from the execution of an adhesion step, elastic pieces 84*a* can engage the electrode layer with the elastic force thereof and maintain an electrical connection.

If solid powder 151*b* is heated in the sintering step, at least the surface part of solid powder 151*b* will have fluidity, and a partial molten state will be attained. At this point, electrode protective layer 152 is pressed by the elastic force of elastic pieces 84*a*, therefore the tip portion of elastic pieces 84*a* partially sinks into or is buried in electrode protective layer 152. At the point of completion of sintering, solid powder 151*b* loses its fluidity and enters a solid state. The change from a fluid state to a solid state in electrode protective layer 152 activates the adhesion function. Thus when electrode protective layer 152 is sintered, elastic pieces 84*a* are strongly adhered to the sintered electrode protective layer 152, as shown in FIG. 12. Thus physical displacement of elastic pieces 84*a* relative to the electrode layer can be prevented when stress or an external load such as heat is applied to elastic pieces 84*a* during operation. Hence electrical conductivity between current collector 82 and the cell array is secured through the electrically conductive electrode protective layer 152.

Thus in the sintering step the contact surface area between elastic pieces 84*a* and the adhesive is increased by the partial sinking or covering up of elastic pieces 84*a* in the adhesive (electrode protective layer 152), strengthening the degree of bonding between the two and enabling the electrical resistance between elastic pieces 84*a* and the electrode layer to be reduced.

Also, in the present embodiment the manufacturing process is simplified by forming electrode layers 103*a*, 103*b* of the same porous material as fuel electrode layer 98 and air electrode layer 101. For this reason the electrode layer has a porous structure, so there is a risk that electrical conductivity may not be very good, or that contact resistance will be high. In this embodiment, however, electrode protective layer 152 is formed not only on the surface of the electrode layer but also inside the pores of a surface layer of the electrode layer, enabling an improvement in the electrical conductivity of the electrode layer and reduction in electrical resistance between electrode protective layer 152 and the electrode layer to constitute a more efficient fuel cell.

In addition, after the solid powder 151*b* penetrating the pores of the electrode layer of porous structure reaches a partially melted state, then solidified and densified as a result of the sintering of electrode protective layer 152, the electrical conductive pathway inside the porous structure is substantially expanded. This enables a densified interconnector structure with high electrical conductivity to be formed.

Moreover, in the process of densification during the sintering step, electrode protective layer 152 is pressed by elastic pieces 84*a*, permitting the density of electrode protective layer 152 to be increased at the locations where elastic pieces 84*a* press upon the electrode layer. This enables a still further increase in electrical conductivity in the electrically conductive pathway near elastic pieces 84*a*.

In addition, in the present embodiment the adhesion step doubles as a densification step, allowing the manufacturing process to be simplified.

If the adhesion application step is executed after a plurality of fuel cells 16 are modularized into a cell array, the adhesion application step becomes extremely cumbersome. However, in the present embodiment the adhesive application step and the binder drying step can be executed on individual fuel cells 16 in a freestanding state before modularization. In the present embodiment, this enables the manufacturing process to be simplified without burdensome work.

Note that in the present embodiment electrode protective layer 152 doubles as an adhesive, but without such limitation, an adhesive separate from electrode protective layer 152 could additionally be used, adhering elastic pieces 84*a* still more strongly to electrode protective layer 152. The use of a different adhesive is valid if the adhesive function from electrode protective layer 152 is insufficient or electrode protective layer 152 has no adhesive function.

Figure 13:
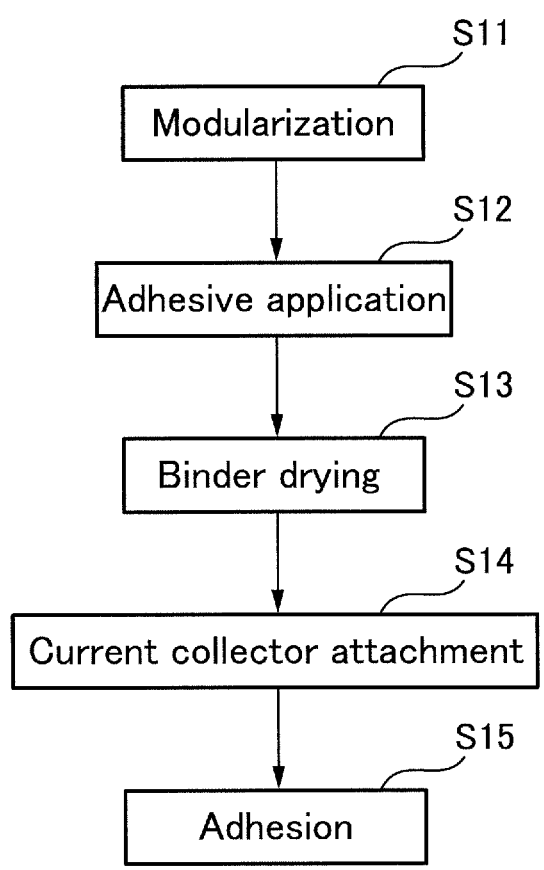
FIG. 13: A flowchart of a current collector affixing method pertaining to a second embodiment in a manufacturing process for the solid oxide fuel cell device according to an embodiment of the present invention.

Next, referring to FIG. 13, we explain a second embodiment of the method for affixing a current collector.

In the above-described first embodiment, the adhesive application step and binder drying step are executed on each fuel cell 16 before the plurality of individual fuel cells 16 are modularized into a cell array, but the adhesive application step and binder drying step can also be executed on the cell array after the modularization step.

That is, in the second embodiment, as shown in FIG. 13, the following steps are executed in this order: a modularization step (step S11), an adhesive application step (step S12), a binder drying step (step S13), a current collector attaching step (step S14), and an adhesion step (step S15).

This constitution enables the binder drying step to be executed at the same time as the ceramic adhesive heating step, thus enabling a shortening of the manufacturing process and a reduction in energy use.

Figure 14:
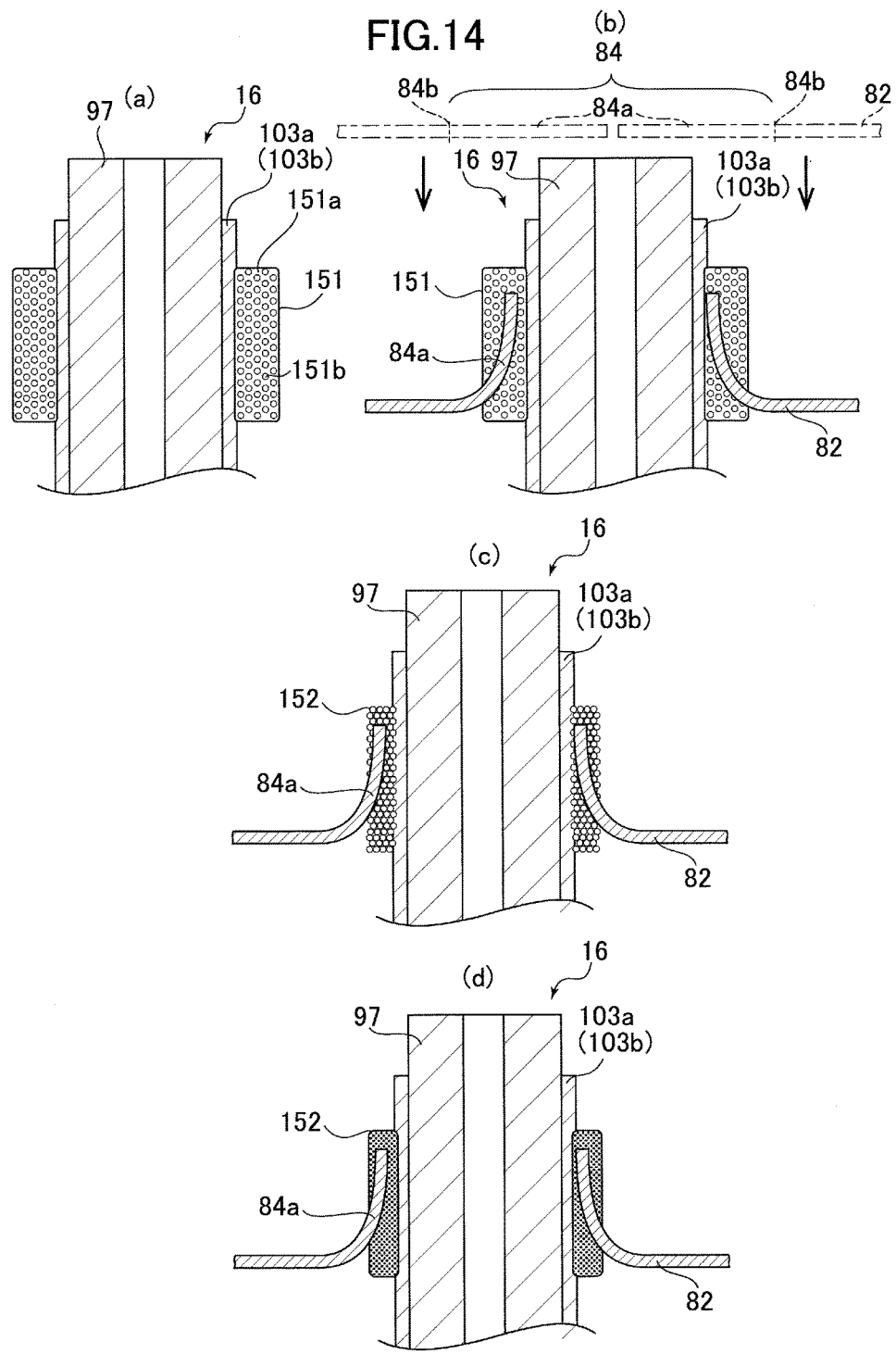
FIG. 14: An explanatory figure of a current collector affixing method pertaining to a third embodiment in a manufacturing process for the solid oxide fuel cell device according to an embodiment of the invention.
Figure 15:
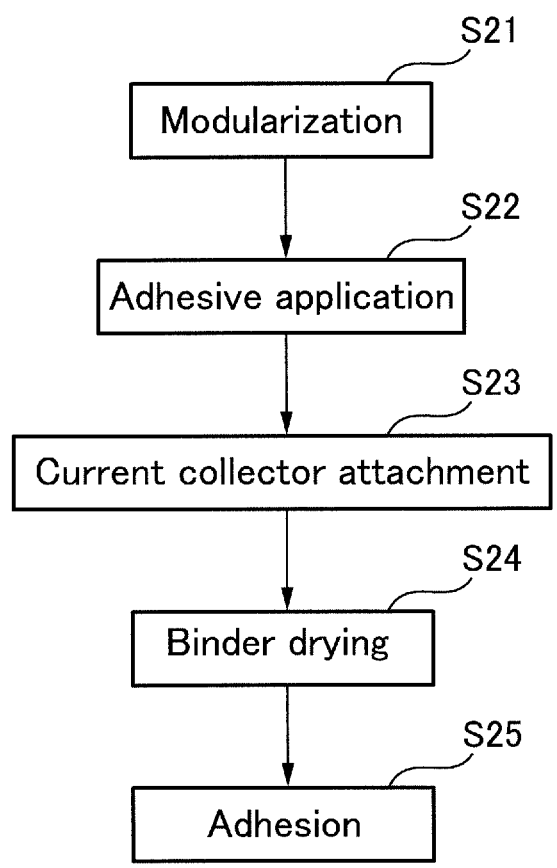
FIG. 15: A flowchart of a current collector affixing method pertaining to the third embodiment.

Next, referring to FIGS. 14 and 15, we explain a third embodiment of the method for affixing a current collector.

In the third embodiment, a plurality of fuel cells 16 are first modularized in a cell array, as shown in FIG. 8 (FIG. 15, step S21).

Next, as shown in FIG. 14(*a*), electrically conductive adhesive 151 is applied to the surface of electrode layers 103*a*, 103*b* (FIG. 15, step S22). In this adhesive application step, adhesive 151 in a paste state is applied thickly onto the surface of the electrode layers. Adhesive 151 comprises a binder component 151*a* and an electrically conductive solid powder 151*b*, and is the same as that in the embodiment shown in FIG. 10.

However, it is preferable for the viscosity of adhesive 151 to be at a level permitting it to pool on the electrode layer after application, so that it can be thickly applied. Therefore in the third embodiment, an electrically conductive adhesive different from that of the FIG. 10 embodiment may be used as the adhesive 151.

Next, as shown in FIG. 14(*b*), each current collector plate 83*a*-83*e* of current collector 82 is positioned relative to the cell array (see the imaginary line in FIG. 14(*b*)), and each current collector plate is pushed into the cell array (FIG. 15, step S23). By this means, individual fuel cells 16 are inserted into corresponding attaching holes 84. When each current collector plate has been pushed into a predetermined position, the elastic pieces 84*a* on attaching holes 84 are positioned on the side of electrode layers 103a, 103b of fuel cell 16 (see the solid line in FIG. 14(b)).

Individual fuel cells 16 are formed of a ceramic material, and are difficult to form with high dimensional accuracy. For this reason, variability in length, diameter, bend, etc. occurs between the plurality of individual fuel cells 16. There is therefore a risk that attaching holes 84 will be offset from their corresponding individual fuel cells 16 even if current collector 82 is positioned relative to the cell array. Hence in the current collector attaching step (step S23) there is a risk that some of the elastic pieces 84a will not contact the electrode layer surface when current collector 82 is temporarily attached to the cell array. For example, the elastic piece 84a on the right side of FIG. 14(b) is contacting the electrode layer surface, but the electrode 84a on the left side is not contacting the electrode layer surface.

Therefore in the adhesive application step (step S22) the fuel cell 16 dimensional error is taken into account and adhesive 151 is applied thickly on the electrode layer. By so doing, in the current collector attaching step, an elastic piece 84a not contacting the surface of an electrode layer can be buried in adhesive 151, or at least can be placed in a state of contact with adhesive 151.

Next, as shown in FIG. 14(c), adhesive 151 is heated and binder component 151a dried (FIG. 15, step S24). This drying step is the same as the drying step explained in relation to FIG. 10(b).

By this drying step, the elastic piece 84a on the right side of FIG. 14(c) is affixed to the electrode layer, a portion of which is covered by electrode protective layer 152 comprising solid powder 151b, in a state of contact with the surface of the electrode layer. At the same time, the elastic piece 84a on the left side of FIG. 14(c) does not contact the surface of the electrode layer, but is affixed to the electrode layer via electrode protective layer 152.

Next, as shown in FIG. 14(d), an adhesion step is executed to adhere elastic pieces 84a and electrode protective layer 152 (FIG. 15, step S25). This adhesion step is the same as the drying step explained in relation to FIG. 10(d).

By this adhesion step, elastic pieces 84a are strongly adhered to the electrode layer. The elastic piece on the right side of FIG. 14(d) is adhered to the electrode layer by electrode protective layer 152 in a state of contact with the surface of the electrode layer, thereby securing direct electrical conductivity with the electrode layer. At the same time, the elastic piece 84a on the left side of FIG. 14(d) is not contacting the electrode layer surface, but because it is adhered to the electrode layer through electrode protective layer 152, electrical conductivity with the electrode layer is secured through electrode protective layer 152, which is electrically conductive.

Thus in the third embodiment, even when the dimensional error in individual fuel cells 16 is comparatively large, and there is no contact with the electrode layer by some elastic pieces 84a after execution of the current collector attaching step, an electrical connection can be reliably made between all of the elastic pieces 84a and the electrode layer.

Also, even if the elastic force of the elastic pieces 84a of current collector 82 drops due to a rise in the temperature of current collector 82 up to the operating temperature when solid oxide fuel cell device 1 is operating, displacement of elastic pieces 84a relative to the electrode layer is prevented by adhesion, so that electrical conductivity between elastic pieces 84a and the electrode layer is secured by electrode protective layer 152.

Figure 16:
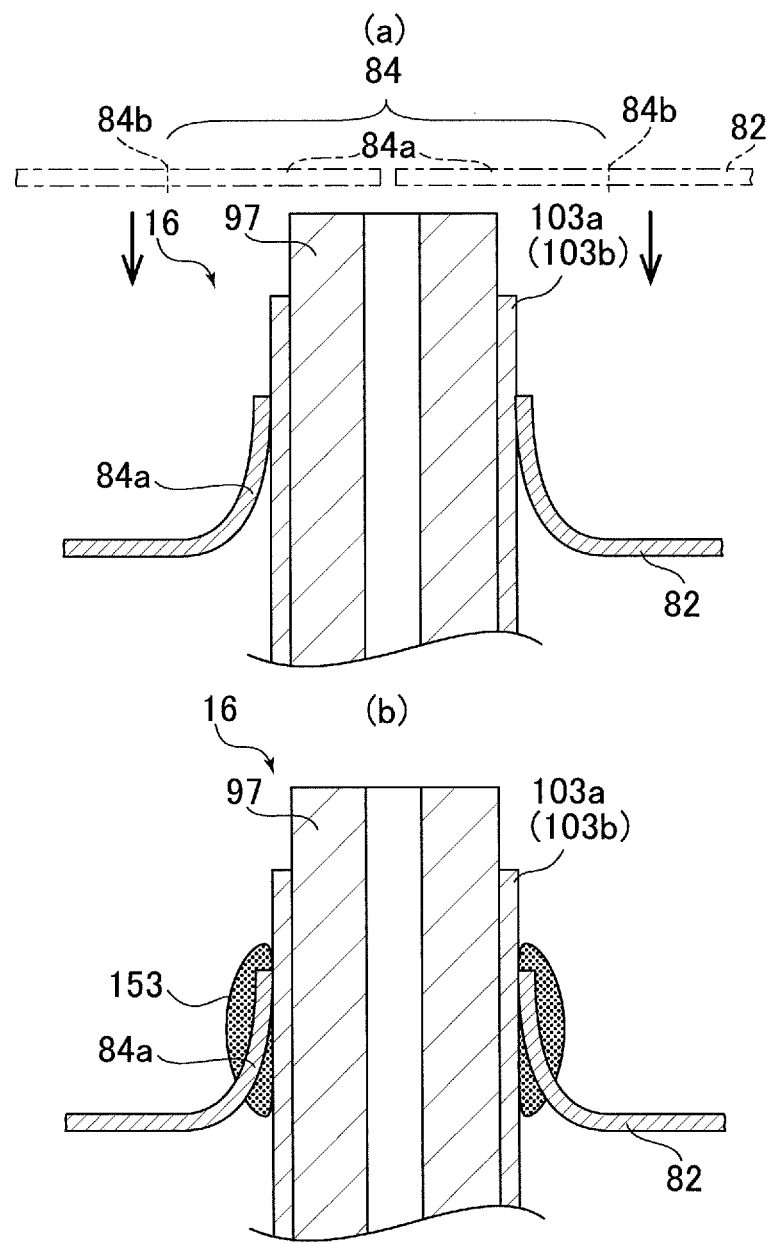
FIG. 16: An explanatory figure of a current collector affixing method pertaining to a fourth embodiment in a manufacturing process for the solid oxide fuel cell device according to an embodiment of the invention.
Figure 17:
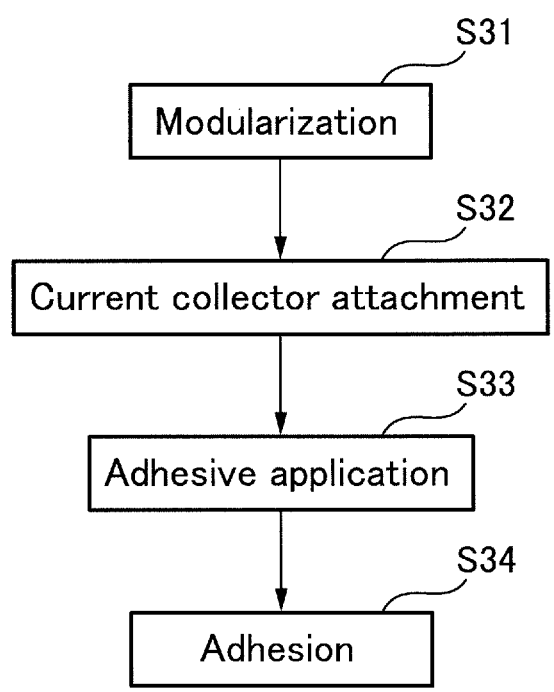
FIG. 17: A flowchart of a current collector affixing method pertaining to the fourth embodiment.

Next, referring to FIGS. 16 and 17, we explain a fourth embodiment of the method for affixing a current collector.

In the fourth embodiment, a plurality of fuel cell 16 are first modularized in a cell array, as shown in FIG. 8 (FIG. 17, step S3).

Next, as shown in FIG. 16(a), each current collector plate 83a-83e of current collector 82 is positioned relative to the cell array (see the imaginary line in FIG. 16(a)), and each current collector plate is pushed into the cell array (FIG. 17, step S32). By this means, individual fuel cells 16 are inserted into the corresponding attaching holes 84. When each current collector plate has been pushed in to a predetermined position, the elastic pieces 84a on attaching holes 84 elastically engage electrode layers 103a, 103b of fuel cell 16 (see the solid line in FIG. 16(a)).

Next, as shown in FIG. 16(b), an adhesive 153 is applied between each of the elastic pieces 84a and electrode layers 103a, 103b (FIG. 17, step S33); adhesive 153 is hardened, and elastic pieces 84a and the electrode layer are adhered (FIG. 17, step S34).

Note that the electrically conductive adhesive used in the first embodiment may be used for adhesive 153, or another electrically conductive adhesive may be used. In this case, after execution of the current collector attaching step (step S32), electrical conductivity can be secured through adhesive 153 even if some of the elastic pieces 84a do not contact the electrode layer.

Also, a non-electrically conductive adhesive may be used as adhesive 153. In such a case, after execution of the current collector attaching step, electrical conductivity can be secured between those elastic pieces 84a and the electrode layer, at least with respect to elastic pieces 84a contacting the electrode layer.

Also, in the present embodiment even if the elastic force of elastic pieces 84a of current collector 82 drops due to a rise in the temperature of current collector 82 up to the operating temperature when solid oxide fuel cell device 1 is operating, electrical conductivity between elastic pieces 84a and the electrode layer is secured by adhesive 153.

As described above, because the dimensional error in individual fuel cells 16 is relatively large, there is a risk in the current collector attaching step (step S32) that individual fuel cells 16 will be offset relative to corresponding attaching holes 84, even if current collector plates are positioned relative to the cell array. Therefore there is a need to press the current collector plates onto the cell array with a comparatively large pressing force, but if the current collector plates are pressed excessively there is a risk that exposed electrode layers 103a, 103b will be damaged (e.g., peeling the electrode layer, etc.) by elastic pieces 84a. To prevent such damage, one conceivable method is to form current collector 82 of an even thinner plate material so as to reduce the elastic force of elastic pieces 84a. However if the elastic force is reduced, then the elastic force of elastic pieces 84a will be further diminished when current collector 82 is exposed to high temperatures during operation of solid oxide fuel cell device 1, leading to the risk that contact between elastic pieces 84a and the electrode layer will lost.

Therefore in the fourth embodiment, displacement of elastic pieces 84a from the electrode layer is prevented by affixing elastic pieces 84a and the electrode layer with adhesive 153, so that non-contact with the electrode layer can be prevented at high temperatures. Hence the use of a current collector 82 with elastic pieces 84a having a low elastic force setting is enabled, and by forming current collector 82 of a thin sheet material, manufacturing cost and reduced device weight can be achieved.

What is claimed is:

1. A method for manufacturing a solid oxide fuel cell device comprising a cell array including a plurality of individual fuel cells housed in a fuel cell module, and a current collector electrically connected to electrodes formed on the end portions of the plurality of individual fuel cells constituting the cell array, comprising:
- a step for respectively forming electrically conductive electrode protective layers on electrodes formed on the end portions of the plurality of individual fuel cells;
- after the step for respectively forming electrically conductive electrode protective layers, a step for arranging the plurality of individual fuel cells in the form of a cell array; and
- after the step for arranging the plurality of individual fuel cells in the form of the cell array, an attaching step for attaching a current collector to the cell array, wherein the current collector is a metal plate in which a plurality of attaching holes are formed for respectively inserting the end portions of the plurality of individual fuel cells, a plurality of elastic pieces are provided at each attaching hole, and by pressing the current collector into the cell array, the end portions of the individual fuel cells are inserted into the corresponding attaching holes of the current collector, and the current collector is attached to the cell array by the elastic force of the elastic pieces;

wherein the electrode protective layer is constituted to prevent damage to the electrode caused by contact of the elastic pieces in the attaching step, and after the current collector is pressed into the cell array in the attaching step, the elastic pieces engage with the electrode protective layers.

2. The method of claim 1, wherein further comprising: after the attaching step, an adhesion step for adhering the elastic pieces and the electrode protective layer.

3. The method of claim 2, wherein the electrode protective layer has the function of adhering the elastic pieces and the electrode.

4. The method of claim 3, wherein the adhering function is activated by heating the electrode protective layer,
- the method for manufacturing the solid oxide fuel cell device includes a heating step for heating the cell array to perform a certain process, and
- the heating step doubles as a step for heating the electrode protective layer in the adhesion step.

5. The method of claim 4, wherein the adhering function is activated by heating the electrode protective layer to fluidize and then solidifying at least a portion of the electrode protective layer.

6. The method of claim 5, wherein the electrode protective layer includes granular electrically conductive material, and
- the adhesion step is a step for sintering the granular electrically conductive material.

* * * * *

UNITED STATES PATENT AND TRADEMARK OFFICE
CERTIFICATE OF CORRECTION

PATENT NO. : 9,871,265 B2
APPLICATION NO. : 14/640990
DATED : January 16, 2018
INVENTOR(S) : Shuhei Tanaka et al.

Page 1 of 1

It is certified that error appears in the above-identified patent and that said Letters Patent is hereby corrected as shown below:

On the Title Page

Left column, item (72), Line 5, replace "Kanagawa" with "Koza"

Signed and Sealed this
Twenty-seventh Day of August, 2019

Andrei Iancu
*Director of the United States Patent and Trademark Office*